(12) United States Patent
Schottek et al.

(10) Patent No.: US 6,469,114 B1
(45) Date of Patent: Oct. 22, 2002

(54) METALLOCENE COMPOUND AND POLYMERIZATION CATALYST COMPRISING HETEROCYCLIC GROUP

(75) Inventors: Jörg Schottek, Frankfurt; Roland Kratzer, Kriftel; Andreas Winter, Glashütten; Volker Fraaije; Michael-Joachim Brekner, both of Frankfurt; Markus Oberhoff, Münster, all of (DE)

(73) Assignee: Basell Polyolefins GmbH, Mainz (DE)

( * ) Notice: Subject to any disclaimer, the term of this patent is extended or adjusted under 35 U.S.C. 154(b) by 0 days.

(21) Appl. No.: 09/646,176

(22) PCT Filed: Jan. 22, 2000

(86) PCT No.: PCT/EP00/00471

§ 371 (c)(1),
(2), (4) Date: Sep. 14, 2000

(87) PCT Pub. No.: WO00/44799

PCT Pub. Date: Aug. 3, 2000

(30) Foreign Application Priority Data

Jan. 28, 1999 (DE) .......................... 199 03 306

(51) Int. Cl.[7] .............................. C08F 4/62; C08F 4/64
(52) U.S. Cl. .................. 526/127; 526/160; 526/161; 526/170; 526/172; 526/943; 502/117; 502/118; 502/152; 502/154; 502/155; 556/18; 556/19; 556/20; 556/53
(58) Field of Search ................................ 502/117, 118, 502/152, 154, 155; 526/127, 160, 161, 170, 172, 943; 556/18, 19, 20, 53

(56) References Cited

PUBLICATIONS

Ewen, J. A., J. Am. Chem. Soc. 120 (1998) 10786–10787.*

* cited by examiner

*Primary Examiner*—David W. Wu
*Assistant Examiner*—R. Rabago
(74) *Attorney, Agent, or Firm*—Keil & Weinkauf

(57) ABSTRACT

Disclosed are compounds of the following core structure, and their use as polymerization catalysts:

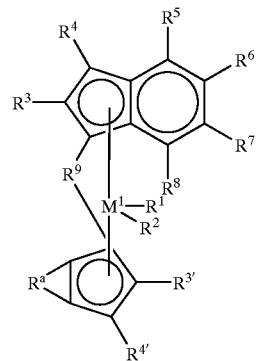

wherein $M^1$ is a group IVb transition metal, $R^5$ is a substituted aryl group, and $R^a$ forms a heteroatom-containing ring fused to the cyclopentadienyl ring.

10 Claims, No Drawings

METALLOCENE COMPOUND AND POLYMERIZATION CATALYST COMPRISING HETEROCYCLIC GROUP

The present invention relates to specifically substituted metallocenes and corresponding highly active supported catalyst systems which can advantageously be used in olefin polymerization and to a process for preparing them and also to polymers which are prepared using the supported catalyst systems. Processes for preparing polyolefins with the aid of soluble, homogeneous catalyst systems comprising a transition metal component of the metallocene type and a cocatalyst component such as an aluminoxane, a Lewis acid or an ionic compound are known. These catalysts have a high activity and give polymers and copolymers having a narrow molar mass distribution.

In polymerization processes using soluble, homogeneous catalyst systems, thick deposits are formed on reactor walls and stirrer when the polymer is obtained as a solid. These deposits are always formed by agglomeration of polymer particles when metallocene and/or cocatalyst are present in dissolved form in the suspension. Such deposits in the reactor systems have to be removed regularly, since they quickly reach considerable thicknesses, have a high strength and prevent heat transfer to the cooling medium. Such homogeneous catalyst systems cannot be used industrially in modern polymerization processes, for example in the liquid monomer or in the gas phase.

To avoid deposit formation in the reactor, supported catalyst systems in which the metallocene and/or the aluminum compounds serving as cocatalyst are fixed on an inorganic support material have been proposed.

EP-A 0 576 970, EP-A 0 659 756 and EP-A 0 659 757 disclose metallocenes and corresponding supported catalyst systems.

To reduce residual catalyst contents in the polymer and for cost reasons, an improvement in the catalyst activities is desirable.

Increasing the loading of the support with active substances (metallocene component(s), cocatalyst(s) and possibly additives) enables the catalyst activities to be increased, but such catalysts at the same time tend to form thick deposits and cannot be used industrially.

It is an object of the present invention to provide specific metallocenes and supported metallocene catalyst systems which make deposit-free polymerization possible under industrially relevant polymerization conditions and give polymers having a high melting point and a high molar mass, even at a high catalyst activity, i.e. high loading with active substances.

We have found that this object is achieved by a specifically substituted metallocene, a supported catalyst system comprising at least one specifically substituted metallocene, at least one cocatalyst, at least one support and, if desired, at least one further additive component.

The catalyst system is prepared according to the present invention by mixing at least one specifically substituted metallocene, at least one cocatalyst and at least one support and, if desired, at least one further additive component.

The metallocene of the present invention, which is also used as metallocene component in the catalyst system of the present invention, is a compound of the formula I below,

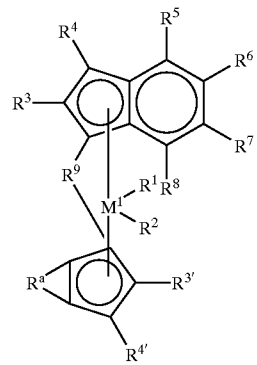

(I)

where $M^1$ is a metal of group IVb of the Periodic Table of the Elements, $R^1$ and $R^2$ are identical or different and are each a hydrogen atom, a $C_1$–$C_{10}$-alkyl group, a $C_1$–$C_{10}$-alkoxy group, a $C_6$–$C_{20}$-aryl group, a $C_6$–$C_{10}$-aryloxy group, a $C_2$–$C_{10}$-alkenyl group, an OH group, an $NR^{12}{}_2$ group, where $R^{12}$ is a $C_1$–$C_{10}$-alkyl group or a $C_6$–$C_{14}$-aryl group, or a halogen atom, $R^3$, $R^4$, $R^6$, $R^7$ and $R^8$ and $R^{3'}$ and $R^{4'}$ are identical or different and are each a hydrogen atom, a hydrocarbon group having from 1 to 40 carbon atoms which may be partially halogenated, halogenated, linear, cyclic or branched, e.g a $C_1$–$C_{10}$-alkyl group, a $C_2$–$C_{10}$-alkyl group, a $C_6$–$C_{20}$-aryl group, a $C_7$–$C_{40}$-arylalkyl group, a $C_7$–$C_{40}$-alkylaryl group or a $C_8$–$C_{40}$-arylalkenyl group, an $Si(R^{13})_3$ group, and $N(R^{13})_2$ group, or $SR^{13}$ group or an $OR^{13}$ group, where $R^{13}$ is as defined for $R^4$ with the proviso that $R^3$ is not hydrogen, where $R^{3'}$ and $R^{4'}$ may also be joined to form a ring, and $R^5$ is a $C_6$–$C_{40}$-aryl group which bears a substituent $R^{14}$ in the para position relative to the point of linkage to the indenyl

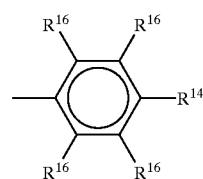

where $R^{14}$ is a halogen atom F, Cl or Br, a $C_1$–$C_{20}$-alkyl radical, a $C_2$–$C_{20}$-alkenyl radical, a $C_6$–$C_{24}$-aryl radical, a $C_7$–$C_{40}$-arylalkyl radical, a $C_7$–$C_{40}$-alkylaryl radical, a $C_8$–$C_{40}$-arylalkenyl radical, where the hydrocarbon radicals may also be halogenated or partially halogenated by fluorine, chlorine or bromine, —$N(R^{15})_2$, —$P(R^{15})_2$, —$SR^{15}$, —$OR^{15}$, —$Si(R^{15})_3$, —$[N(R^{15})_3]^+$ or —$[P(R^{15})_3]^+$, where $R^{15}$ is as defined for $R^4$, the radicals $R^{16}$ can be identical or different despite having the same index and are hydrogen or as defined for $R^{14}$ and any two adjacent radicals $R^{16}$ may also be joined to form a ring, or one or more of the radicals $R^{16}$ together with the radicals $R^6$ or $R^4$ and/or $R^{14}$ form a ring, with the proviso that $R^{14}$ may also be hydrogen when at least one of the radicals $R^{16}$ is different from hydrogen, $R^9$ is a bridge

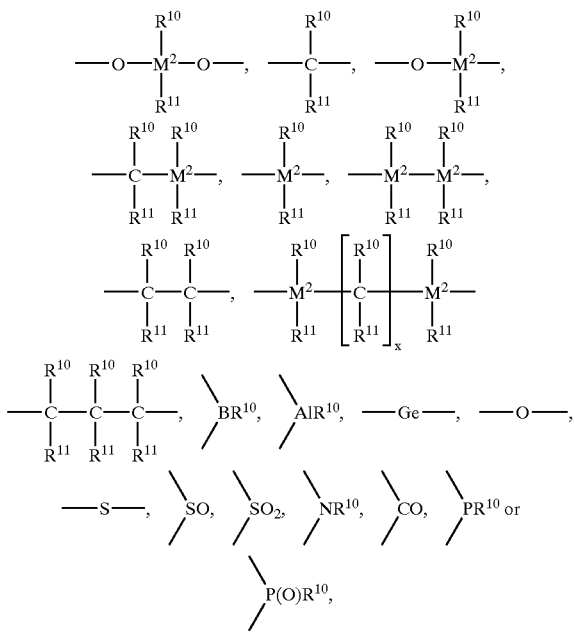

where
$R^{10}$, $R^{11}$ can be identical or different, even when having the same index, and are each a hydrogen atom, a halogen atom, a heteroatom-containing $C_1$–$C_{40}$-hydrocarbon group or a $C_1$–$C_{40}$-hydrocarbon group, for example a $C_1$–$C_{20}$-alkyl group, a $C_1$–$C_{10}$-fluoroalkyl group, a $C_1$–$C_{10}$-alkoxy group, a $C_6$–$C_{14}$-aryl group, a $C_6$–$C_{10}$-fluoroaryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group, $-N(R^{17})_2$, $-P(R^{17})_2$, $-SR^{17}$, $-OR^{17}$, $-SiR_3^{7}$, $-[N(R^{17})_3]^+$ or $-[P(R^{17})_3]^+$ where $R^{17}$ is as defined for $R^4$, or $R^{10}$ and $R^{11}$ in each case together with the atoms connecting them form one or more rings, x is an integer from 0 to 18, $M^2$ is silicon, germanium or tin, where heteroatom-containing hydrocarbon groups are hydrocarbons which contain at least one element of groups 13 to 16 of the Periodic Table of the Elements, and $R^9$ may also link two units of the formula I to one another, and $R^a$ is a saturated or unsaturated hydrocarbon group, preferably having from 1 to 40 carbon atoms, in particular from 1 to 30 carbon atoms, which may also be substituted by one or more radicals as defined for $R^3$, where the radical $R^a$ as such contains at least one heteroatom from groups 13, 14, 15 or 16 of the Periodic Table of the Elements.

The above definition of $R^a$ implies that the heteroatom is present as part of the ring system. Should the ring system already include at least one heteroatom, then one or more radicals $R^3$ can also contain a heteroatom.

The 4,5,6,7-tetrahydroindenyl analogues corresponding to the compounds of the formula I are likewise of importance.

In formula I, it is preferred that
$M^1$ is zirconium, hafnium or titanium,
$R^1$ and $R^2$ are identical and are methyl, dimethylamine, dibenzyl or chlorine, $R^3$ and $R^{3'}$ are identical or different and are each a hydrocarbon group which may be partially halogenated, halogenated, linear, cyclic or branched, e.g. a $C_1$–$C_{10}$-alkyl group, a $C_2$–$C_{10}$-alkenyl group or a $C_7$–$C_{40}$-alkylaryl group, $R^9$ is $R^{10}R^{11}Si=$, $R^{10}R^{11}Ge=$, $R^{10}R^{11}C=$ or $-(R^{10}R^{11}C-CR^{10}R^{11})-$, where $R^{10}$ and $R^{11}$ are identical or different and are each hydrogen or a $C_1$–$C_{20}$-hydrocarbon group, in particular $C_1$–$C_{10}$-alkyl or $C_6$–$C_{14}$-aryl, $R^5$ is a $C_6$–$C_{20}$-aryl group which bears a substituent $R^{14}$ in the para position relative to the point of linkage to the indenyl ring, and $R^{14}$ is a $C_1$–$C_{10}$-alkyl radical, a $C_2$–$C_{10}$-alkenyl radical, a $C_6$–$C_{18}$-aryl radical, a $C_7$–$C_{20}$-arylalkyl radical, a $C_7$–$C_{20}$-alkylaryl radical, a $C_8$–$C_{20}$-arylalkenyl radical, where the hydrocarbon radicals may also be halogenated or partially halogenated by fluorine and/or chlorine, $-NR_2^{15}$, $-P(R^{15})_2$, $-SR^{15}$, $-Si(R^{15})_3$, $-[N(R^{15})_3]^+$ or $-[P(R^{15})_3]^+$, where $R^{15}$ is as defined for $R^4$, and the radicals $R^{16}$ are identical or different and are each fluorine, chlorine, hydrogen, a $C_1$–$C_{10}$-alkyl radical which may also be halogenated or partially halogenated by fluorine and/or chlorine, a $C_6$–$C_{18}$-aryl radical or a $C_2$–$C_{20}$-alkenyl radical, or adjacent radicals $R^{16}$ are joined to form a ring, and $R^a$ is a saturated or unsaturated hydrocarbon group having from 2 to 40 carbon atoms which may also be substituted by radicals as defined for $R^3$ and contains at least one heteroatom selected from the group consisting of B, Al, Si, Sn, N, P, O or S.

In formula I, it is very particularly preferred that
$M^1$ is zirconium,
$R^1$ and $R^2$ are identical and are methyl or chlorine,
$R^3$ and $R^{3'}$ are identical or different and are each a hydrocarbon group which may be halogenated, linear, cyclic or branched, e.g. a $C_1$–$C_{10}$-alkyl group, a $C_2$–$C_{10}$-alkenyl group or a $C_7$–$C_{40}$-alkylaryl group, $R^9$ is $R^{10}R^{11}Si=$, $R^{10}R^{11}C=$ or $-(R^{10}R^{11}C-CR^{10}R^{11})-$, where $R^{10}$ and $R^{11}$ are identical or different and are hydrogen, phenyl, methyl or ethyl, and the radicals $R^4$, $R^6$, $R^7$ and $R^8$ and also $R^{4'}$ are hydrogen, $R^5$ is a $C_6$–$C_{20}$-aryl group, in particular a phenyl, naphthyl or anthracenyl group, which bears a substituent $R^{14}$ in the para position relative to the point of linkage to the indenyl ring, where $R^{14}$ is an $Si(R^{15})_3$ radical, where $R^{15}$ is as defined for $R^4$, or a linear $C_1$–$C_{10}$-alkyl radical, a branched $C_3$–$C_{10}$-alkyl radical, a $C_2$–$C_{10}$-alkenyl radical or a branched $C_7$–$C_{20}$-alkyaryl radical, where the hydrocarbon radicals may also be halogenated or partially halogenated by fluorine or chlorine, and $R^a$ is a saturated or unsaturated hydrocarbon group having from 1 to 30 carbon atoms which may also be substituted by radicals as defined for $R^3$ and contains at least one heteroatom selected from the group consisting of N, P, O or S.

The fragment $R^a$ together with the cyclopentadienyl ring to which it is bound very particularly preferably forms the following molecular fragments of the formula I (in the molecular fragments, the hydrogen atoms have not been shown in the heteroatom-containing rings in the interests of clarity. Only radicals R which can be different from hydrogen have been shown and indexed):

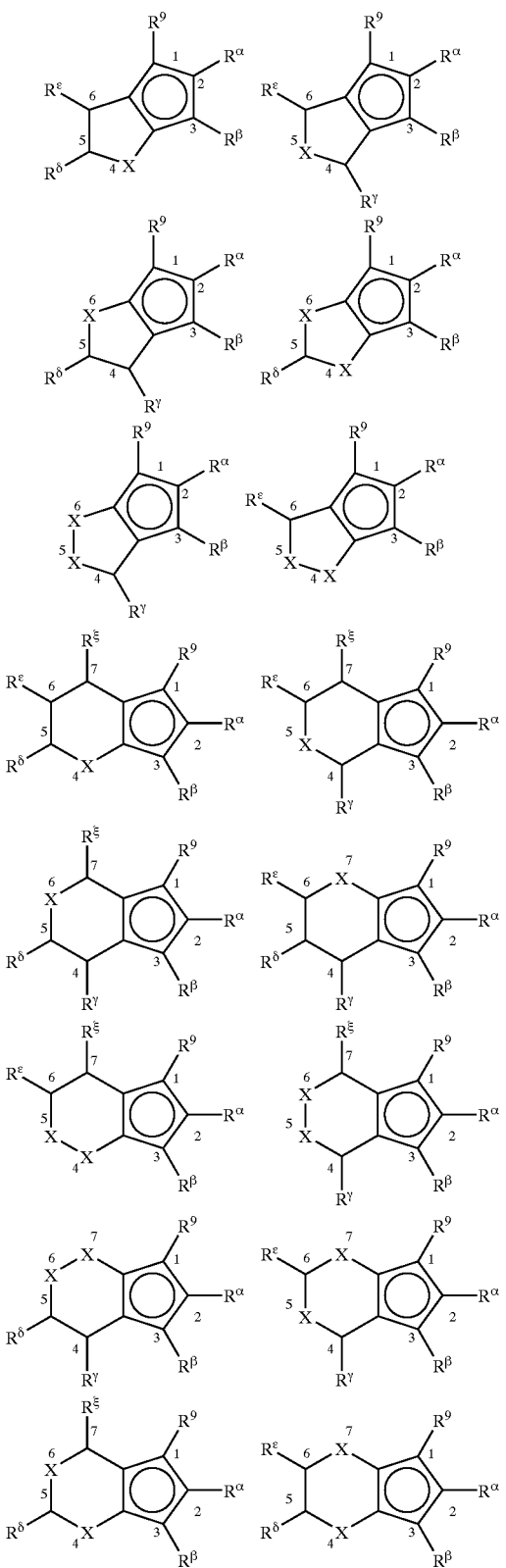

In these formulae, the heteroatoms functions X are identical or different and are $NR^\lambda$, $PR^\lambda$, N, O or S, the radicals $R^\gamma$, $R^\delta$, $R^\epsilon$, $R^\alpha$ and $R^\lambda$ are hydrogen or are as defined for $R^2$, the radicals $R^\alpha$ are as defined for $R^{3'}$ and the radicals $R^\beta$ are as defined for $R^{4'}$.

Examples of preferred metallocene components of the catalyst system of the present invention are combinations of the following molecular fragments of the compound I:

$M^1R^1R^2$: $ZrCl_2$, $Zr(CH_3)_2$, $R^3$, $R^{3'}$: is methyl, ethyl, n-propyl, isopropyl, isobutyl, n-butyl, s-butyl, $R^4$, $R^8$, $R^{4'}$: hydrogen $R^6$, $R^7$: hydrogen, $C_1$–$C_4$-alkyl, $C_6$–$C_{10}$-aryl, $R^5$: p-methylphenyl, p-ethylphenyl, p-n-propylphenyl, p-isopropylphenyl, p-n-butylphenyl, p-tert-butylphenyl, p-s-butylphenyl, p-pentylphenyl, p-hexylphenyl, p-cyclohexylphenyl, p-trimethylsilylphenyl, p-adamantylphenyl, p-$(F_3C)_3$C-phenyl, $R^9$: dimethylsilanediyl, phenyl(methyl)silanediyl, diphenylsilanediyl, dimethylgermanediyl, ethylidene, 1-methylethylidene, 1,1-dimethylethylidene, 1,2-dimethylethylidene, 1,1,2,2-tetramethylethylidene, dimethylmethylidene, phenyl(methyl)methylidene, diphenylmethylidene, $R^a$: 2-alkyl-4-azapentalenes, 2-alkyl-5-azapentalenes, 2-alkyl-6-azapentalenes, 2-alkyl-N-aryl-4-azapentalenes, 2-alkyl-N-aryl-5-azapentalenes, 2-alkyl-N-aryl-6-azapentalenes, 2,5-dialkyl-4-azapentalenes, 2,5-dialkyl-6-azapentalenes, 2,5-dialkyl-N-aryl-4-azapentalenes, 2,5-dialkyl-N-aryl-6-azapentalenes, 2-alkyl-4-phosphapentalenes, 2-alkyl-5-phosphapentalenes, 2-alkyl-6-phosphapentalenes, 2-alkyl-P-aryl-4-phosphapentalenes, 2-alkyl-P-aryl-5-phosphapentalenes, 2-alkyl-P-aryl-6-phosphapentalenes, 2,5-dialkyl-4-phosphapentalenes, 2,5-dialkyl-6-phosphapentalenes, 2,5-dialkyl-P-aryl-4-phosphapentalenes, 2,5-dialkyl-P-aryl-6-phosphapentalenes, 2-alkyl-4-thiapentalenes, 2-alkyl-5-thiapentalenes, 2-alkyl-6-thiapentalenes, 2,5-dialkyl-4-thiapentalenes, 2,5-dialkyl-6-thiapentalenes, 2-alkyl-4-oxapentalenes, 2-alkyl-5-oxapentalenes, 2-alkyl-6-oxapentalenes, 2,5-dialkyl-4-oxapentalenes or 2,5-dialkyl-6-oxapentalenes.

Specific examples of preferred metallocene components of the catalyst system of the present invention are thus the following compounds I:

dimethylsilanediyl(2-methyl-4-azapentalene)(2-methyl-4-(4'-methylphenylindenyl)zirconium dichloride dimethylsilanediyl(2-methyl-5-azapentalene)(2-methyl-4-(4'-methylphenylindenyl)zirconium dichloride dimethylsilanediyl(2-methyl-6-azapentalene)(2-methyl-4-(4'-methylphenylindenyl)zirconium dichloride dimethylsilanediyl(2-methyl-N-phenyl-4-azapentalene)(2-methyl-4-(4'-methylphenylindenyl)zirconium dichloride dimethylsilanediyl(2-methyl-N-phenyl-5-azapentalene)(2-methyl-4-(4'-methylphenylindenyl)zirconium dichloride dimethylsilanediyl(2-methyl-N-phenyl-6-azapentalene)(2-methyl-4-(4'-methylphenylindenyl)zirconium dichloride dimethylsilanediyl(2,5-dimethyl-4-azapentalene)(2-methyl-4-(4'-methylphenylindenyl)zirconium dichloride dimethylsilanediyl(2,5-dimethyl-6-azapentalene)(2-methyl-4-(4'-methylphenylindenyl)zirconium dichloride dimethylsilanediyl(2,5-dimethyl-N-phenyl-4-azapentalene)(2-methyl-4-(4'-methylphenylindenyl)zirconium dichloride dimethylsilanediyl(2,5-dimethyl-N-phenyl-6-azapentalene)(2-methyl-4-(4'-methylphenylindenyl)zirconium dichloride dimethylsilanediyl(2-methyl-4-thiapentalene)(2-methyl-4-(4'-methylphenylindenyl)zirconium dichloride
dimethylsilanediyl(2-methyl-5-thiapentalene)(2-methyl-4-(4'-methylphenylindenyl)zirconium dichloride
dimethylsilanediyl(2-methyl-6-thiapentalene)(2-methyl-4-(4'-methylphenylindenyl)zirconium dichloride
dimethylsilanediyl(2,5-dimethyl-4-thiapentalene)(2-methyl-4-(4'-methylphenylindenyl)zirconium dichloride
dimethylsilanediyl(2,5-dimethyl-6-thiapentalene)(2-methyl-4-(4'-methylphenylindenyl)zirconium dichloride
dimethylsilanediyl(2-methyl-4-oxapentalene)(2-methyl-4-(4'-methylphenylindenyl)zirconium dichloride
dimethylsilanediyl(2-methyl-5-oxapentalene)(2-methyl-4-(4'-methylphenylindenyl)zirconium dichloride
dimethylsilanediyl(2-methyl-6-oxapentalene)(2-methyl-4-(4'-methylphenylindenyl)zirconium dichloride
dimethylsilanediyl(2,5-dimethyl-4-oxapentalene)(2-methyl-4-(4'-methylphenylindenyl)zirconium dichloride
dimethylsilanediyl(2,5-dimethyl-6-oxapentalene)(2-methyl-4-(4'-methylphenylindenyl)zirconium dichloride
dimethylsilanediyl(2-methyl-4-azapentalene)(2-methyl-4-(4'-ethylphenylindenyl)zirconium dichloride
dimethylsilanediyl(2-methyl-5-azapentalene)(2-methyl-4-(4'-ethylphenylindenyl)zirconium dichloride
dimethylsilanediyl(2-methyl-6-azapentalene)(2-methyl-4-(4'-ethylphenylindenyl)zirconium dichloride
dimethylsilanediyl(2-methyl-N-phenyl-4-azapentalene)(2-methyl-4-(4'-ethylphenylindenyl)zirconium dichloride
dimethylsilanediyl(2-methyl-N-phenyl-5-azapentalene)(2-methyl-4-(4'-ethylphenylindenyl)zirconium dichloride
dimethylsilanediyl(2-methyl-N-phenyl-6-azapentalene)(2-methyl-4-(4'-ethylphenylindenyl)zirconium dichloride
dimethylsilanediyl(2,5-dimethyl-4-azapentalene)(2-methyl-4-(4'-ethylphenylindenyl)zirconium dichloride
dimethylsilanediyl(2,5-dimethyl-6-azapentalene)(2-methyl-4-(4'-ethylphenylindenyl)zirconium dichloride
dimethylsilanediyl(2,5-dimethyl-N-phenyl-4-azapentalene)(2-methyl-4-(4'-ethylphenylindenyl)zirconium dichloride
dimethylsilanediyl(2,5-dimethyl-N-phenyl-6-azapentalene)(2-methyl-4-(4'-ethylphenylindenyl)zirconium dichloride
dimethylsilanediyl(2-methyl-4-thiapentalene)(2-methyl-4-(4'-ethylphenylindenyl)zirconium dichloride
dimethylsilanediyl(2-methyl-5-thiapentalene)(2-methyl-4-(4'-ethylphenylindenyl)zirconium dichloride
dimethylsilanediyl(2-methyl-6-thiapentalene)(2-methyl-4-(4'-ethylphenylindenyl)zirconium dichloride
dimethylsilanediyl(2,5-dimethyl-4-thiapentalene)(2-methyl-4-(4'-ethylphenylindenyl)zirconium dichloride
dimethylsilanediyl(2,5-dimethyl-6-thiapentalene)(2-methyl-4-(4'-ethylphenylindenyl)zirconium dichloride
dimethylsilanediyl(2-methyl-4-oxapentalene)(2-methyl-4-(4'-ethylphenylindenyl)zirconium dichloride
dimethylsilanediyl(2-methyl-5-oxapentalene)(2-methyl-4-(4'-ethylphenylindenyl)zirconium dichloride
dimethylsilanediyl(2-methyl-6-oxapentalene)(2-methyl-4-(4'-ethylphenylindenyl)zirconium dichloride
dimethylsilanediyl(2,5-dimethyl-4-oxapentalene)(2-methyl-4-(4'-ethylphenylindenyl)zirconium dichloride
dimethylsilanediyl(2,5-dimethyl-6-oxapentalene)(2-methyl-4-(4'-ethylphenylindenyl)zirconium dichloride
dimethylsilanediyl(2-methyl-4-azapentalene)(2-methyl-4-(4'-n-propylphenylindenyl)zirconium dichloride
dimethylsilanediyl(2-methyl-5-azapentalene)(2-methyl-4-(4'-n-propylphenylindenyl)zirconium dichloride
dimethylsilanediyl(2-methyl-6-azapentalene)(2-methyl-4-(4'-n-propylphenylindenyl)zirconium dichloride
dimethylsilanediyl(2-methyl-N-phenyl-4-azapentalene)(2-methyl-4-(4'-n-propylphenylindenyl)zirconium dichloride
dimethylsilanediyl(2-methyl-N-phenyl-5-azapentalene)(2-methyl-4-(4'-n-propylphenylindenyl)zirconium dichloride
dimethylsilanediyl(2-methyl-N-phenyl-6-azapentalene)(2-methyl-4-(4'-n-propylphenylindenyl)zirconium dichloride
dimethylsilanediyl(2,5-dimethyl-4-azapentalene)(2-methyl-4-(4'-n-propylphenylindenyl)zirconium dichloride
dimethylsilanediyl(2,5-dimethyl-6-azapentalene)(2-methyl-4-(4'-n-propylphenylindenyl)zirconium dichloride
dimethylsilanediyl(2,5-dimethyl-N-phenyl-4-azapentalene)(2-methyl-4-(4'-n-propylphenylindenyl)zirconium dichloride
dimethylsilanediyl(2,5-dimethyl-N-phenyl-6-azapentalene)(2-methyl-4-(4'-n-propylphenylindenyl)zirconium dichloride
dimethylsilanediyl(2-methyl-4-thiapentalene)(2-methyl-4-(4'-n-propylphenylindenyl)zirconium dichloride
dimethylsilanediyl(2-methyl-5-thiapentalene)(2-methyl-4-(4'-n-propylphenylindenyl)zirconium dichloride
dimethylsilanediyl(2-methyl-6-thiapentalene)(2-methyl-4-(4'-n-propylphenylindenyl)zirconium dichloride
dimethylsilanediyl(2,5-dimethyl-4-thiapentalene)(2-methyl-4-(4'-n-propylphenylindenyl)zirconium dichloride
dimethylsilanediyl(2,5-dimethyl-6-thiapentalene)(2-methyl-4-(4'-n-propylphenylindenyl)zirconium dichloride
dimethylsilanediyl(2-methyl-4-oxapentalene)(2-methyl-4-(4'-n-propylphenylindenyl)zirconium dichloride
dimethylsilanediyl(2-methyl-5-oxapentalene)(2-methyl-4-(4'-n-propylphenylindenyl)zirconium dichloride
dimethylsilanediyl(2-methyl-6-oxapentalene)(2-methyl-4-(4'-n-propylphenylindenyl)zirconium dichloride
dimethylsilanediyl(2,5-dimethyl-4-oxapentalene)(2-methyl-4-(4'-n-propylphenylindenyl)zirconium dichloride
dimethylsilanediyl(2,5-dimethyl-6-oxapentalene)(2-methyl-4-(4'-n-propylphenylindenyl)zirconium dichloride
dimethylsilanediyl(2-methyl-4-azapentalene)(2-methyl-4-(4'-isopropylphenylindenyl)zirconium dichloride
dimethylsilanediyl(2-methyl-5-azapentalene)(2-methyl-4-(4'-isopropylphenylindenyl)zirconium dichloride
dimethylsilanediyl(2-methyl-6-azapentalene)(2-methyl-4-(4'-isopropylphenylindenyl)zirconium dichloride
dimethylsilanediyl(2-methyl-N-phenyl-4-azapentalene)(2-methyl-4-(4'-isopropylphenylindenyl)zirconium dichloride
dimethylsilanediyl(2-methyl-N-phenyl-5-azapentalene)(2-methyl-4-(4'-isopropylphenylindenyl)zirconium dichloride
dimethylsilanediyl(2-methyl-N-phenyl-6-azapentalene)(2-methyl-4-(4'-isopropylphenylindenyl)zirconium dichloride
dimethylsilanediyl(2,5-dimethyl-4-azapentalene)(2-methyl-4-(4'-isopropylphenylindenyl)zirconium dichloride
dimethylsilanediyl(2,5-dimethyl-6-azapentalene)(2-methyl-4-(4'-isopropylphenylindenyl)zirconium dichloride
dimethylsilanediyl(2,5-dimethyl-N-phenyl-4-azapentalene)(2-methyl-4-(4'-isopropylphenylindenyl)zirconium dichloride
dimethylsilanediyl(2,5-dimethyl-N-phenyl-6-azapentalene)(2-methyl-4-(4'-isopropylphenylindenyl)zirconium dichloride
dimethylsilanediyl(2-methyl-4-thiapentalene)(2-methyl-4-(4'-isopropylphenylindenyl)zirconium dichloride
dimethylsilanediyl(2-methyl-5-thiapentalene)(2-methyl-4-(4'-isopropylphenylindenyl)zirconium dichloride dimethylsilanediyl(2-methyl-6-thiapentalene)(2-methyl-4-(4'-isopropylphenylindenyl)zirconium dichloride
dimethylsilanediyl(2,5-dimethyl-4-thiapentalene)(2-methyl-4-(4'-isopropylphenylindenyl)zirconium dichloride
dimethylsilanediyl(2,5-dimethyl-6-thiapentalene)(2-methyl-4-(4'-isopropylphenylindenyl)zirconium dichloride
dimethylsilanediyl(2-methyl-4-oxapentalene)(2-methyl-4-(4'-isopropylphenylindenyl)zirconium dichloride
dimethylsilanediyl(2-methyl-5-oxapentalene)(2-methyl-4-(4'-isopropylphenylindenyl)zirconium dichloride
dimethylsilanediyl(2-methyl-6-oxapentalene)(2-methyl-4-(4'-isopropylphenylindenyl)zirconium dichloride
dimethylsilanediyl(2,5-dimethyl-4-oxapentalene)(2-methyl-4-(4'-isopropylphenylindenyl)zirconium dichloride
dimethylsilanediyl(2,5-dimethyl-6-oxapentalene)(2-methyl-4-(4'-isopropylphenylindenyl)zirconium dichloride
dimethylsilanediyl(2-methyl-4-azapentalene)(2-methyl-4-(4'-n-butylphenylindenyl)zirconium dichloride
dimethylsilanediyl(2-methyl-5-azapentalene)(2-methyl-4-(4'-n-butylphenylindenyl)zirconium dichloride
dimethylsilanediyl(2-methyl-6-azapentalene)(2-methyl-4-(4'-n-butylphenylindenyl)zirconium dichloride
dimethylsilanediyl(2-methyl-N-phenyl-4-azapentalene)(2-methyl-4-(4'-n-butylphenylindenyl)zirconium dichloride
dimethylsilanediyl(2-methyl-N-phenyl-5-azapentalene)(2-methyl-4-(4'-n-butylphenylindenyl)zirconium dichloride
dimethylsilanediyl(2-methyl-N-phenyl-6-azapentalene)(2-methyl-4-(4'-n-butylphenylindenyl)zirconium dichloride
dimethylsilanediyl(2,5-dimethyl-4-azapentalene)(2-methyl-4-(4'-n-butylphenylindenyl)zirconium dichloride
dimethylsilanediyl(2,5-dimethyl-6-azapentalene)(2-methyl-4-(4'-n-butylphenylindenyl)zirconium dichloride
dimethylsilanediyl(2,5-dimethyl-N-phenyl-4-azapentalene)(2-methyl-4-(4'-n-butylphenylindenyl)zirconium dichloride
dimethylsilanediyl(2,5-dimethyl-N-phenyl-6-azapentalene)(2-methyl-4-(4'-n-butylphenylindenyl)zirconium dichloride
dimethylsilanediyl(2-methyl-4-thiapentalene)(2-methyl-4-(4'-n-butylphenylindenyl)zirconium dichloride
dimethylsilanediyl(2-methyl-5-thiapentalene)(2-methyl-4-(4'-n-butylphenylindenyl)zirconium dichloride
dimethylsilanediyl(2-methyl-6-thiapentalene)(2-methyl-4-(4'-n-butylphenylindenyl)zirconium dichloride
dimethylsilanediyl(2,5-dimethyl-4-thiapentalene)(2-methyl-4-(4'-n-butylphenylindenyl)zirconium dichloride
dimethylsilanediyl(2,5-dimethyl-6-thiapentalene)(2-methyl-4-(4'-n-butylphenylindenyl)zirconium dichloride
dimethylsilanediyl(2-methyl-4-oxapentalene)(2-methyl-4-(4'-n-butylphenylindenyl)zirconium dichloride
dimethylsilanediyl(2-methyl-5-oxapentalene)(2-methyl-4-(4'-n-butylphenylindenyl)zirconium dichloride
dimethylsilanediyl(2-methyl-6-oxapentalene)(2-methyl-4-(4'-n-butylphenylindenyl)zirconium dichloride
dimethylsilanediyl(2,5-dimethyl-4-oxapentalene)(2-methyl-4-(4'-n-butylphenylindenyl)zirconium dichloride
dimethylsilanediyl(2,5-dimethyl-6-oxapentalene)(2-methyl-4-(4'-n-butylphenylindenyl)zirconium dichloride
dimethylsilanediyl(2-methyl-4-azapentalene)(2-methyl-4-(4'-s-butylphenylindenyl)zirconium dichloride
dimethylsilanediyl(2-methyl-5-azapentalene)(2-methyl-4-(4'-s-butylphenylindenyl)zirconium dichloride
dimethylsilanediyl(2-methyl-6-azapentalene)(2-methyl-4-(4'-s-butylphenylindenyl)zirconium dichloride
dimethylsilanediyl(2-methyl-N-phenyl-4-azapentalene)(2-methyl-4-(4'-s-butylphenylindenyl)zirconium dichloride
dimethylsilanediyl(2-methyl-N-phenyl-5-azapentalene)(2-methyl-4-(4'-s-butylphenylindenyl)zirconium dichloride
dimethylsilanediyl(2-methyl-N-phenyl-6-azapentalene)(2-methyl-4-(4'-s-butylphenylindenyl)zirconium dichloride
dimethylsilanediyl(2,5-dimethyl-4-azapentalene)(2-methyl-4-(4'-s-butylphenylindenyl)zirconium dichloride
dimethylsilanediyl(2,5-dimethyl-6-azapentalene)(2-methyl-4-(4'-s-butylphenylindenyl)zirconium dichloride
dimethylsilanediyl(2,5-dimethyl-N-phenyl-4-azapentalene)(2-methyl-4-(4'-s-butylphenylindenyl)zirconium dichloride
dimethylsilanediyl(2,5-dimethyl-N-phenyl-6-azapentalene)(2-methyl-4-(4'-s-butylphenylindenyl)zirconium dichloride
dimethylsilanediyl(2-methyl-4-thiapentalene)(2-methyl-4-(4'-s-butylphenylindenyl)zirconium dichloride
dimethylsilanediyl(2-methyl-5-thiapentalene)(2-methyl-4-(4'-s-butylphenylindenyl)zirconium dichloride
dimethylsilanediyl(2-methyl-6-thiapentalene)(2-methyl-4-(4'-s-butylphenylindenyl)zirconium dichloride
dimethylsilanediyl(2,5-dimethyl-4-thiapentalene)(2-methyl-4-(4'-s-butylphenylindenyl)zirconium dichloride
dimethylsilanediyl(2,5-dimethyl-6-thiapentalene)(2-methyl-4-(4'-s-butylphenylindenyl)zirconium dichloride
dimethylsilanediyl(2-methyl-4-oxapentalene)(2-methyl-4-(4'-s-butylphenylindenyl)zirconium dichloride
dimethylsilanediyl(2-methyl-5-oxapentalene)(2-methyl-4-(4'-s-butylphenylindenyl)zirconium dichloride
dimethylsilanediyl(2-methyl-6-oxapentalene)(2-methyl-4-(4'-s-butylphenylindenyl)zirconium dichloride
dimethylsilanediyl(2,5-dimethyl-4-oxapentalene)(2-methyl-4-(4'-s-butylphenylindenyl)zirconium dichloride
dimethylsilanediyl(2,5-dimethyl-6-oxapentalene)(2-methyl-4-(4'-s-butylphenylindenyl)zirconium dichloride
dimethylsilanediyl(2-methyl-4-azapentalene)(2-methyl-4-(4'-tert-butylphenylindenyl)zirconium dichloride
dimethylsilanediyl(2-methyl-5-azapentalene)(2-methyl-4-(4'-tert-butylphenylindenyl)zirconium dichloride
dimethylsilanediyl(2-methyl-6-azapentalene)(2-methyl-4-(4'-tert-butylphenylindenyl)zirconium dichloride
dimethylsilanediyl(2-methyl-N-phenyl-4-azapentalene)(2-methyl-4-(4'-tert-butylphenylindenyl)zirconium dichloride
dimethylsilanediyl(2-methyl-N-phenyl-5-azapentalene)(2-methyl-4-(4'-tert-butylphenylindenyl)zirconium dichloride
dimethylsilanediyl(2-methyl-N-phenyl-6-azapentalene)(2-methyl-4-(4'-tert-butylphenylindenyl)zirconium dichloride
dimethylsilanediyl(2,5-dimethyl-4-azapentalene)(2-methyl-4-(4'-tert-butylphenylindenyl)zirconium dichloride
dimethylsilanediyl(2,5-dimethyl-6-azapentalene)(2-methyl-4-(4'-tert-butylphenylindenyl)zirconium dichloride
dimethylsilanediyl(2,5-dimethyl-N-phenyl-4-azapentalene)(2-methyl-4-(4'-tert-butylphenylindenyl)zirconium dichloride
dimethylsilanediyl(2,5-dimethyl-N-phenyl-6-azapentalene)(2-methyl-4-(4'-tert-butylphenylindenyl)zirconium dichloride
dimethylsilanediyl(2-methyl-4-thiapentalene)(2-methyl-4-(4'-tert-butylphenylindenyl)zirconium dichloride
dimethylsilanediyl(2-methyl-5-thiapentalene)(2-methyl-4-(4'-tert-butylphenylindenyl)zirconium dichloride
dimethylsilanediyl(2-methyl-6-thiapentalene)(2-methyl-4-(4'-tert-butylphenylindenyl)zirconium dichloride
dimethylsilanediyl(2,5-dimethyl-4-thiapentalene)(2-methyl-4-(4'-tert-butylphenylindenyl)zirconium dichloride dimethylsilanediyl(2,5-dimethyl-6-thiapentalene)(2-methyl-4-(4'-tert-butylphenylindenyl)zirconium dichloride
dimethylsilanediyl(2-methyl-4-oxapentalene)(2-methyl-4-(4'-tert-butylphenylindenyl)zirconium dichloride
dimethylsilanediyl(2-methyl-5-oxapentalene)(2-methyl-4-(4'-tert-butylphenylindenyl)zirconium dichloride
dimethylsilanediyl(2-methyl-6-oxapentalene)(2-methyl-4-(4'-tert-butylphenylindenyl)zirconium dichloride
dimethylsilanediyl(2,5-dimethyl-4-oxapentalene)(2-methyl-4-(4'-tert-butylphenylindenyl)zirconium dichloride
dimethylsilanediyl(2,5-dimethyl-6-oxapentalene)(2-methyl-4-(4'-tert-butylphenylindenyl)zirconium dichloride
dimethylsilanediyl(2-methyl-4-azapentalene)(2-methyl-4-(4'-n-pentylphenylindenyl)zirconium dichloride
dimethylsilanediyl(2-methyl-5-azapentalene)(2-methyl-4-(4'-n-pentylphenylindenyl)zirconium dichloride
dimethylsilanediyl(2-methyl-6-azapentalene)(2-methyl-4-(4'-n-pentylphenylindenyl)zirconium dichloride
dimethylsilanediyl(2-methyl-N-phenyl-4-azapentalene)(2-methyl-4-(4'-n-pentylphenylindenyl)zirconium dichloride
dimethylsilanediyl(2-methyl-N-phenyl-5-azapentalene)(2-methyl-4-(4'-n-pentylphenylindenyl)zirconium dichloride
dimethylsilanediyl(2-methyl-N-phenyl-6-azapentalene)(2-methyl-4-(4'-n-pentylphenylindenyl)zirconium dichloride
dimethylsilanediyl(2,5-dimethyl-4-azapentalene)(2-methyl-4-(4'-n-pentylphenylindenyl)zirconium dichloride
dimethylsilanediyl(2,5-dimethyl-6-azapentalene)(2-methyl-4-(4'-n-pentylphenylindenyl)zirconium dichloride
dimethylsilanediyl(2,5-dimethyl-N-phenyl-4-azapentalene)(2-methyl-4-(4'-n-pentylphenylindenyl)zirconium dichloride
dimethylsilanediyl(2,5-dimethyl-N-phenyl-6-azapentalene)(2-methyl-4-(4'-n-pentylphenylindenyl)zirconium dichloride
dimethylsilanediyl(2-methyl-4-thiapentalene)(2-methyl-4-(4'-n-pentylphenylindenyl)zirconium dichloride
dimethylsilanediyl(2-methyl-5-thiapentalene)(2-methyl-4-(4'-n-pentylphenylindenyl)zirconium dichloride
dimethylsilanediyl(2-methyl-6-thiapentalene)(2-methyl-4-(4'-n-pentylphenylindenyl)zirconium dichloride
dimethylsilanediyl(2,5-dimethyl-4-thiapentalene)(2-methyl-4-(4'-n-pentylphenylindenyl)zirconium dichloride
dimethylsilanediyl(2,5-dimethyl-6-thiapentalene)(2-methyl-4-(4'-n-pentylphenylindenyl)zirconium dichloride
dimethylsilanediyl(2-methyl-4-oxapentalene)(2-methyl-4-(4'-n-pentylphenylindenyl)zirconium dichloride
dimethylsilanediyl(2-methyl-5-oxapentalene)(2-methyl-4-(4'-n-pentylphenylindenyl)zirconium dichloride
dimethylsilanediyl(2-methyl-6-oxapentalene)(2-methyl-4-(4'-n-pentylphenylindenyl)zirconium dichloride
dimethylsilanediyl(2,5-dimethyl-4-oxapentalene)(2-methyl-4-(4'-n-pentylphenylindenyl)zirconium dichloride
dimethylsilanediyl(2,5-dimethyl-6-oxapentalene)(2-methyl-4-(4'-n-pentylphenylindenyl)zirconium dichloride
dimethylsilanediyl(2-methyl-4-azapentalene)(2-methyl-4-(4'-n-hexylphenylindenyl)zirconium dichloride
dimethylsilanediyl(2-methyl-5-azapentalene)(2-methyl-4-(4'-n-hexylphenylindenyl)zirconium dichloride
dimethylsilanediyl(2-methyl-6-azapentalene)(2-methyl-4-(4'-n-hexylphenylindenyl)zirconium dichloride
dimethylsilanediyl(2-methyl-N-phenyl-4-azapentalene)(2-methyl-4-(4'-n-hexylphenylindenyl)zirconium dichloride
dimethylsilanediyl(2-methyl-N-phenyl-5-azapentalene)(2-methyl-4-(4'-n-hexylphenylindenyl)zirconium dichloride
dimethylsilanediyl(2-methyl-N-phenyl-6-azapentalene)(2-methyl-4-(4'-n-hexylphenylindenyl)zirconium dichloride
dimethylsilanediyl(2,5-dimethyl-4-azapentalene)(2-methyl-4-(4'-n-hexylphenylindenyl)zirconium dichloride
dimethylsilanediyl(2,5-dimethyl-6-azapentalene)(2-methyl-4-(4'-n-hexylphenylindenyl)zirconium dichloride
dimethylsilanediyl(2,5-dimethyl-N-phenyl-4-azapentalene)(2-methyl-4-(4'-n-hexylphenylindenyl)zirconium dichloride
dimethylsilanediyl(2,5-dimethyl-N-phenyl-6-azapentalene)(2-methyl-4-(4'-n-hexylphenylindenyl)zirconium dichloride
dimethylsilanediyl(2-methyl-4-thiapentalene)(2-methyl-4-(4'-n-hexylphenylindenyl)zirconium dichloride
dimethylsilanediyl(2-methyl-5-thiapentalene)(2-methyl-4-(4'-n-hexylphenylindenyl)zirconium dichloride
dimethylsilanediyl(2-methyl-6-thiapentalene)(2-methyl-4-(4'-n-hexylphenylindenyl)zirconium dichloride
dimethylsilanediyl(2,5-dimethyl-4-thiapentalene)(2-methyl-4-(4'-n-hexylphenylindenyl)zirconium dichloride
dimethylsilanediyl(2,5-dimethyl-6-thiapentalene)(2-methyl-4-(4'-n-hexylphenylindenyl)zirconium dichloride
dimethylsilanediyl(2-methyl-4-oxapentalene)(2-methyl-4-(4'-n-hexylphenylindenyl)zirconium dichloride
dimethylsilanediyl(2-methyl-5-oxapentalene)(2-methyl-4-(4'-n-hexylphenylindenyl)zirconium dichloride
dimethylsilanediyl(2-methyl-6-oxapentalene)(2-methyl-4-(4'-n-hexylphenylindenyl)zirconium dichloride
dimethylsilanediyl(2,5-dimethyl-4-oxapentalene)(2-methyl-4-(4'-n-hexylphenylindenyl)zirconium dichloride
dimethylsilanediyl(2,5-dimethyl-6-oxapentalene)(2-methyl-4-(4'-n-hexylphenylindenyl)zirconium dichloride
dimethylsilanediyl(2-methyl-4-azapentalene)(2-methyl-4-(4'-cyclohexylphenylindenyl)zirconium dichloride
dimethylsilanediyl(2-methyl-5-azapentalene)(2-methyl-4-(4'-cyclohexylphenylindenyl)zirconium dichloride
dimethylsilanediyl(2-methyl-6-azapentalene)(2-methyl-4-(4'-cyclohexylphenylindenyl)zirconium dichloride
dimethylsilanediyl(2-methyl-N-phenyl-4-azapentalene)(2-methyl-4-(4'-cyclohexylphenylindenyl)zirconium dichloride
dimethylsilanediyl(2-methyl-N-phenyl-5-azapentalene)(2-methyl-4-(4'-cyclohexylphenylindenyl)zirconium dichloride
dimethylsilanediyl(2-methyl-N-phenyl-6-azapentalene)(2-methyl-4-(4'-cyclohexylphenylindenyl)zirconium dichloride
dimethylsilanediyl(2,5-dimethyl-4-azapentalene)(2-methyl-4-(4'-cyclohexylphenylindenyl)zirconium dichloride
dimethylsilanediyl(2,5-dimethyl-6-azapentalene)(2-methyl-4-(4'-cyclohexylphenylindenyl)zirconium dichloride
dimethylsilanediyl(2,5-dimethyl-N-phenyl-4-azapentalene)(2-methyl-4-(4'-cyclohexylphenylindenyl)zirconium dichloride
dimethylsilanediyl(2,5-dimethyl-N-phenyl-6-azapentalene)(2-methyl-4-(4'-cyclohexylphenylindenyl)zirconium dichloride
dimethylsilanediyl(2-methyl-4-thiapentalene)(2-methyl-4-(4'-cyclohexylphenylindenyl)zirconium dichloride
dimethylsilanediyl(2-methyl-5-thiapentalene)(2-methyl-4-(4'-cyclohexylphenylindenyl)zirconium dichloride
dimethylsilanediyl(2-methyl-6-thiapentalene)(2-methyl-4-(4'-cyclohexylphenylindenyl)zirconium dichloride
dimethylsilanediyl(2,5-dimethyl-4-thiapentalene)(2-methyl-4-(4'-cyclohexylphenylindenyl)zirconium dichloride
dimethylsilanediyl(2,5-dimethyl-6-thiapentalene)(2-methyl-4-(4'-cyclohexylphenylindenyl)zirconium dichloride dimethylsilanediyl(2-methyl-4-oxapentalene)(2-methyl-4-(4'-cyclohexylphenylindenyl)zirconium dichloride
dimethylsilanediyl(2-methyl-5-oxapentalene)(2-methyl-4-(4'-cyclohexylphenylindenyl)zirconium dichloride
dimethylsilanediyl(2-methyl-6-oxapentalene)(2-methyl-4-(4'-cyclohexylphenylindenyl)zirconium dichloride
dimethylsilanediyl(2,5-dimethyl-4-oxapentalene)(2-methyl-4-(4'-cyclohexylphenylindenyl)zirconium dichloride
dimethylsilanediyl(2,5-dimethyl-6-oxapentalene)(2-methyl-4-(4'-cyclohexylphenylindenyl)zirconium dichloride
dimethylsilanediyl(2-methyl-4-azapentalene)(2-methyl-4-(4'-trimethylsilylphenylindenyl)zirconium dichloride
dimethylsilanediyl(2-methyl-5-azapentalene)(2-methyl-4-(4'-trimethylsilylphenylindenyl)zirconium dichloride
dimethylsilanediyl(2-methyl-6-azapentalene)(2-methyl-4-(4'-trimethylsilylphenylindenyl)zirconium dichloride
dimethylsilanediyl(2-methyl-N-phenyl-4-azapentalene)(2-methyl-4-(4'-trimethylsilylphenylindenyl)zirconium dichloride
dimethylsilanediyl(2-methyl-N-phenyl-5-azapentalene)(2-methyl-4-(4'-trimethylsilylphenylindenyl)zirconium dichloride
dimethylsilanediyl(2-methyl-N-phenyl-6-azapentalene)(2-methyl-4-(4'-trimethylsilylphenylindenyl)zirconium dichloride
dimethylsilanediyl(2,5-dimethyl-4-azapentalene)(2-methyl-4-(4'-trimethylsilylphenylindenyl)zirconium dichloride
dimethylsilanediyl(2,5-dimethyl-6-azapentalene)(2-methyl-4-(4'-trimethylsilylphenylindenyl)zirconium dichloride
dimethylsilanediyl(2,5-dimethyl-N-phenyl-4-azapentalene)(2-methyl-4-(4'-trimethylsilylphenylindenyl)zirconium dichloride
dimethylsilanediyl(2,5-dimethyl-N-phenyl-6-azapentalene)(2-methyl-4-(4'-trimethylsilylphenylindenyl)zirconium dichloride
dimethylsilanediyl(2-methyl-4-thiapentalene)(2-methyl-4-(4'-trimethylsilylphenylindenyl)zirconium dichloride
dimethylsilanediyl(2-methyl-5-thiapentalene)(2-methyl-4-(4'-trimethylsilylphenylindenyl)zirconium dichloride
dimethylsilanediyl(2-methyl-6-thiapentalene)(2-methyl-4-(4'-trimethylsilylphenylindenyl)zirconium dichloride
dimethylsilanediyl(2,5-dimethyl-4-thiapentalene)(2-methyl-4-(4'-trimethylsilylphenylindenyl)zirconium dichloride
dimethylsilanediyl(2,5-dimethyl-6-thiapentalene)(2-methyl-4-(4'-trimethylsilylphenylindenyl)zirconium dichloride
dimethylsilanediyl(2-methyl-4-oxapentalene)(2-methyl-4-(4'-trimethylsilylphenylindenyl)zirconium dichloride
dimethylsilanediyl(2-methyl-5-oxapentalene)(2-methyl-4-(4'-trimethylsilylphenylindenyl)zirconium dichloride
dimethylsilanediyl(2-methyl-6-oxapentalene)(2-methyl-4-(4'-trimethylsilylphenylindenyl)zirconium dichloride
dimethylsilanediyl(2,5-dimethyl-4-oxapentalene)(2-methyl-4-(4'-trimethylsilylphenylindenyl)zirconium dichloride
dimethylsilanediyl(2,5-dimethyl-6-oxapentalene)(2-methyl-4-(4'-trimethylsilylphenylindenyl)zirconium dichloride
dimethylsilanediyl(2-methyl-4-azapentalene)(2-methyl-4-(4'-adamantylphenylindenyl)zirconium dichloride
dimethylsilanediyl(2-methyl-5-azapentalene)(2-methyl-4-(4'-adamantylphenylindenyl)zirconium dichloride
dimethylsilanediyl(2-methyl-6-azapentalene)(2-methyl-4-(4'-adamantylphenylindenyl)zirconium dichloride
dimethylsilanediyl(2-methyl-N-phenyl-4-azapentalene)(2-methyl-4-(4'-adamantylphenylindenyl)zirconium dichloride
dimethylsilanediyl(2-methyl-N-phenyl-5-azapentalene)(2-methyl-4-(4'-adamantylphenylindenyl)zirconium dichloride
dimethylsilanediyl(2-methyl-N-phenyl-6-azapentalene)(2-methyl-4-(4'-adamantylphenylindenyl)zirconium dichloride
dimethylsilanediyl(2,5-dimethyl-4-azapentalene)(2-methyl-4-(4'-adamantylphenylindenyl)zirconium dichloride
dimethylsilanediyl(2,5-dimethyl-6-azapentalene)(2-methyl-4-(4'-adamantylphenylindenyl)zirconium dichloride
dimethylsilanediyl(2,5-dimethyl-4-azapentalene)(2-methyl-4-(4'-adamantylphenylindenyl)zirconium dichloride
dimethylsilanediyl(2,5-dimethyl-N-phenyl-4-azapentalene)(2-methyl-4-(4'-adamantylphenylindenyl)zirconium dichloride
dimethylsilanediyl(2,5-dimethyl-N-phenyl-6-azapentalene)(2-methyl-4-(4'-adamantylphenylindenyl)zirconium dichloride
dimethylsilanediyl(2-methyl-4-thiapentalene)(2-methyl-4-(4'-adamantylphenylindenyl)zirconium dichloride
dimethylsilanediyl(2-methyl-5-thiapentalene)(2-methyl-4-(4'-adamantylphenylindenyl)zirconium dichloride
dimethylsilanediyl(2-methyl-6-thiapentalene)(2-methyl-4-(4'-adamantylphenylindenyl)zirconium dichloride
dimethylsilanediyl(2,5-dimethyl-4-thiapentalene)(2-methyl-4-(4'-adamantylphenylindenyl)zirconium dichloride
dimethylsilanediyl(2,5-dimethyl-6-thiapentalene)(2-methyl-4-(4'-adamantylphenylindenyl)zirconium dichloride
dimethylsilanediyl(2-methyl-4-oxapentalene)(2-methyl-4-(4'-adamantylphenylindenyl)zirconium dichloride
dimethylsilanediyl(2-methyl-5-oxapentalene)(2-methyl-4-(4'-adamantylphenylindenyl)zirconium dichloride
dimethylsilanediyl(2-methyl-6-oxapentalene)(2-methyl-4-(4'-adamantylphenylindenyl)zirconium dichloride
dimethylsilanediyl(2,5-dimethyl-4-oxapentalene)(2-methyl-4-(4'-adamantylphenylindenyl)zirconium dichloride
dimethylsilanediyl(2,5-dimethyl-6-oxapentalene)(2-methyl-4-(4'-adamantylphenylindenyl)zirconium dichloride
dimethylsilanediyl(2-methyl-4-azapentalene)(2-methyl-4-(4'-tris(trifluoromethyl)methylphenylindenyl)zirconium dichloride
dimethylsilanediyl(2-methyl-5-azapentalene)(2-methyl-4-(4'-tris(trifluoromethyl)methylphenylindenyl)zirconium dichloride
dimethylsilanediyl(2-methyl-6-azapentalene)(2-methyl-4-(4'-tris(trifluoromethyl)methylphenylindenyl)zirconium dichloride
dimethylsilanediyl(2-methyl-N-phenyl-4-azapentalene)(2-methyl-4-(4'-tris(trifluoromethyl)methylphenylindenyl)zirconium dichloride
dimethylsilanediyl(2-methyl-N-phenyl-5-azapentalene)(2-methyl-4-(4'-tris(trifluoromethyl)methylphenylindenyl)zirconium dichloride
dimethylsilanediyl(2-methyl-N-phenyl-6-azapentalene)(2-methyl-4-(4'-tris(trifluoromethyl)methylphenylindenyl)zirconium dichloride
dimethylsilanediyl(2,5-dimethyl-4-azapentalene)(2-methyl-4-(4'-tris(trifluoromethyl)methylphenylindenyl)zirconium dichloride
dimethylsilanediyl(2,5-dimethyl-6-azapentalene)(2-methyl-4-(4'-tris(trifluoromethyl)methylphenylindenyl)zirconium dichloride
dimethylsilanediyl(2,5-dimethyl-N-phenyl-4-azapentalene)(2-methyl-4-(4'-tris(trifluoromethyl)methylphenylindenyl)zirconium dichloride
dimethylsilanediyl(2,5-dimethyl-N-phenyl-6-azapentalene)(2-methyl-4-(4'-tris(trifluoromethyl)methylphenylindenyl)zirconium dichloride dimethylsilanediyl(2-methyl-4-thiapentalene)(2-methyl-4-(4'-tris(trifluoromethyl)methylphenylindenyl)zirconium dichloride dimethylsilanediyl(2-methyl-5-thiapentalene)(2-methyl-4-(4'-tris(trifluoromethyl)methylphenylindenyl)zirconium dichloride dimethylsilanediyl(2-methyl-6-thiapentalene)(2-methyl-4-(4'-tris(trifluoromethyl)methylphenylindenyl)zirconium dichloride dimethylsilanediyl(2,5-dimethyl-4-thiapentalene)(2-methyl-4-(4'-tris(trifluoromethyl)methylphenylindenyl)zirconium dichloride dimethylsilanediyl(2,5-dimethyl-6-thiapentalene)(2-methyl-4-(4'-tris(trifluoromethyl)methylphenylindenyl)zirconium dichloride dimethylsilanediyl(2-methyl-4-oxapentalene)(2-methyl-4-(4'-tris(trifluoromethyl)methylphenylindenyl)zirconium dichloride dimethylsilanediyl(2-methyl-5-oxapentalene)(2-methyl-4-(4'-tris(trifluoromethyl)methylphenylindenyl)zirconium dichloride dimethylsilanediyl(2-methyl-6-oxapentalene)(2-methyl-4-(4'-tris(trifluoromethyl)methylphenylindenyl)zirconium dichloride dimethylsilanediyl(2,5-dimethyl-4-oxapentalene)(2-methyl-4-(4'-tris(trifluoromethyl)methylphenylindenyl)zirconium dichloride dimethylsilanediyl(2,5-dimethyl-6-oxapentalene)(2-methyl-4-(4'-tris(trifluoromethyl)methylphenylindenyl)zirconium dichloride dimethylsilanediyl(2-methyl-4-azapentalene)(2-ethyl-4-(4'-tert-butylphenylindenyl)zirconium dichloride dimethylsilanediyl(2-methyl-5,6-dihydro-4-azapentalene)(2-ethyl-4-(4'-tert-butylphenylindenyl)zirconium dichloride dimethylsilanediyl(2-methyl-4-azapentalene)(2-ethyl-4-(4'-tert-butylphenyltetrahydroindenyl)zirconium dichloride dimethylsilanediyl(2-methyl-5-azapentalene)(2-n-butyl-4-(4'-tert-butylphenylindenyl)zirconium dichloride ethylidene(2-methyl-6-azapentalene)(2-methyl-4-(4'-tert-butylphenylindenyl)zirconium dichloride dimethylsilanediyl(2-methyl-N-trimethylsilyl-4-azapentalene)(2-methyl-4-(4'-tert-butylphenylindenyl)zirconium dichloride dimethylsilanediyl(2-methyl-N-tolyl-5-azapentalene)(2-n-propyl-4-(4'-tert-butylphenylindenyl)zirconium dichloride dimethylgermanediyl(2-methyl-N-phenyl-6-azapentalene)(2-methyl-4-(4'-tert-butylphenylindenyl)zirconium dichloride methylethylidene(2,5-dimethyl-4-azapentalene)(2-methyl-4-(4'-tert-butylphenylindenyl)zirconium dichloride dimethylsilanediyl(2,5-diisopropyl-6-azapentalene)(2-methyl-4-(4'-tert-butylphenylindenyl)zirconium dichloride dimethylsilanediyl(2,5-dimethyl-N-phenyl-4-azapentalene)(2,6-dimethyl-4-(4'-tert-butylphenylindenyl)zirconium dichloride dimethylsilanediyl(2,5-dimethyl-N-phenyl-6-azapentalene)(2-methyl-4-(6'-tert-butylnaphthylindenyl)zirconium dichloride dimethylsilanediyl(2,5-dimethyl-N-phenyl-6-azapentalene)(2-methyl-4-(6'-tert-butylanthracenylindenyl)zirconium dichloride dimethylsilanediyl(2-methyl-4-phosphapentalene)(2-methyl-4-(4'-tert-butylphenylindenyl)zirconium dichloride diphenylsilanediyl(2-methyl-5-thiapentalene)(2-methyl-4-(4'-tert-butylphenylindenyl)zirconium dichloride methylphenylsilanediyl(2-methyl-6-thiapentalene)(2-methyl-4-(4'-tert-butylphenylindenyl)zirconium dichloride methylidene(2,5-dimethyl-4-thiapentalene)(2-methyl-4-(4'-tert-butylphenylindenyl)zirconium dichloride dimethylmethylidene(2,5-dimethyl-6-thiapentalene)(2-methyl-4-(4'-tert-butylphenylindenyl)zirconium dichloride diphenylsilanediyl(2,5-dimethyl-4-oxapentalene)(2-methyl-4-(4'-tert-butylphenylindenyl)zirconium dichloride diphenylsilanediyl(2,5-dimethyl-6-oxapentalene)(2-methyl-4-(4'-tert-butylphenylindenyl)zirconium dichloride.

Further specific examples of preferred metallocene components are the corresponding homologues of the above-mentioned compounds substituted in the 2 position and/or 2,5 positions by ethyl, n-propyl, isopropyl, isobutyl, n-butyl and s-butyl.

In the polymerizations, the metallocene of the formula I can be used as an isomer mixture or as one of the possible racemic isomers in pure or enriched form. Possible methods of preparing metallocenes of the formula I are described in principle in, for example, Journal of Organometallic Chemistry 288 (1985) 63–67 and the documents cited therein and also WO 98/22486, EPA 0 659 757 or EP 0 576 970.

The catalyst system of the present invention preferably further comprises at least one cocatalyst.

The cocatalyst component which may, according to the present invention, be present in the catalyst system comprises at least one compound such as an aluminoxane or a Lewis acid or an ionic compound which reacts with a metallocene to convert it into a cationic compound.

The aluminoxanes which can be used in the process of the present invention may, for example, be cyclic as in formula II

(II)

or linear as in formula III

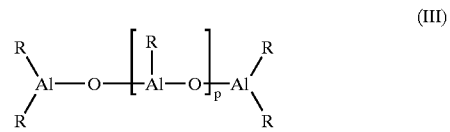

(III)

where p=0 to 100, or of the cluster type as in formula IV,

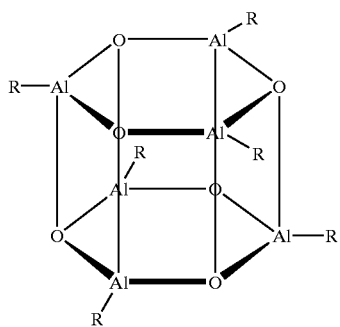

(IV)

as are described in recent literature; cf. JACS 117 (1995), 6465–74 or Organometallics 13 (1994), 2957–2969.

The radicals R in the formulae (II), (III) and (IV) may be identical or different and may each be a $C_1$–$C_{20}$-hydrocarbon group such as a $C_1$–$C_6$-alkyl group, a $C_6$–$C_{18}$-aryl group, benzyl or hydrogen, and p is an integer from 2 to 50, preferably from 10 to 35.

The radicals R are preferably identical and are methyl, isobutyl, n-butyl, phenyl or benzyl, particularly preferably methyl.

If the radicals R are different, they are preferably methyl and hydrogen, methyl and isobutyl or methyl and n-butyl, with hydrogen or isobutyl or n-butyl preferably being present in an amount of 0.01–40% (number of radicals R).

The aluminoxane can be prepared in various ways by known methods. One of the methods is, for example, to react an aluminum hydrocarbon compound and/or a hydridoaluminum hydrocarbon compound with water (gaseous, solid, liquid or bound, for example as water of crystallization) in an inert solvent (e.g. toluene). To prepare an aluminoxane having different alkyl groups R, two different trialkylaluminums ($AlR_3$+$AlR'_3$) corresponding to the desired composition and reactivity are reacted with water (cf. S. Pasynkiewicz, Polyhedron 9 (1990) 429 and EP-A 302 424).

Regardless of the method of preparation, all aluminoxane solutions have a varying content of unreacted aluminum starting compound, which is present in free form or as adduct.

As Lewis acid, preference is given to using at least one organoboron or organoaluminum compound containing $C_1$–$C_{20}$ groups such as branched or unbranched alkyl or haloalkyl, e.g. methyl, propyl, isopropyl, isobutyl or trifluoromethyl, or unsaturated groups such as aryl or haloaryl, e.g. phenyl, tolyl, benzyl, p-fluorophenyl, 3,5-difluorophenyl, pentachlorophenyl, pentafluorophenyl, 3,4,5-trifluorophenyl or 3,5-di(trifluoromethyl)phenyl.

Preferred Lewis acids are trimethylaluminum, triethylaluminum, triisobutylaluminum, tributylaluminum, trifluoroborane, triphenylborane, tris(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)borane and/or tris(3,4,5-trifluorophenyl)borane. Particular preference is given to tris(pentafluorophenyl)borane.

As ionic catalysts, preference is given to using compounds which contain a noncoordinating anion, for example tetrakis(pentafluorophenyl)borates, tetraphenylborates, $SbF_6$—, $CF_3SO_3$— or $ClO_4$—. As cationic counterion, use is made of Lewis bases such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline, triethylphosphine, triphenylphosphine, diphenylphosphine, tetrahydrothiophene and triphenylcarbenium.

Examples of such ionic compounds which can be used according to the present invention are triethylammonium tetra(phenyl)borate,
tributylammonium tetra(phenyl)borate,
trimethylammonium tetra(tolyl)borate,
tributylammonium tetra(tolyl)borate,
tributylammonium tetra(pentafluorophenyl)borate,
tributylammonium tetra(pentafluorophenyl)aluminate,
tripropylammonium tetra(dimethylphenyl)borate,
tributylammonium tetra(trifluoromethylphenyl)borate,
tributylammonium tetra(4-fluorophenyl)borate,
N,N-dimethylanilinium tetra(phenyl)borate,
N,N-diethylanilinium tetra(phenyl)borate,
N,N-dimethylanilinium tetrakis(pentafluorophenyl)borate,
N,N-dimethylanilinium tetrakis(pentafluorophenyl)aluminate,
di(propyl)ammonium tetrakis(pentafluorophenyl)borate,
di(cyclohexyl)ammonium tetrakis(pentafluorophenyl)borate,
triphenylphosphonium tetrakis(phenyl)borate,
triethylphosphonium tetrakis(phenyl)borate,
diphenylphosphonium tetrakis(phenyl)borate,
tri(methylphenyl)phosphonium tetrakis(phenyl)borate,
tri(dimethylphenyl)phosphonium tetrakis(phenyl)borate,
triphenylcarbenium tetrakis(pentafluorophenyl)borate,
triphenylcarbenium tetrakis(pentafluorophenyl)aluminate,
triphenylcarbenium tetrakis(phenyl)aluminate,
ferrocenium tetrakis(pentafluorophenyl)borate and/or
ferrocenium tetrakis(pentafluorophenyl)aluminate.

Preference is given to triphenylcarbenium tetrakis(pentafluorophenyl)borate and/or N,N-dimethylanilinium tetrakis(pentafluorophenyl)borate.

It is also possible to use mixtures of at least one Lewis acid and at least one ionic compound.

Further cocatalyst components which are likewise of importance are borane or carborane compounds such as 7,8-dicarbaundecaborane(13),
undecahydrido-7,8-dimethyl-7,8-dicarbaundecaborane,
dodecahydrido-1-phenyl-1,3-dicarbanonaborane,
tri(butyl)ammonium undecahydrido-8-ethyl-7,9-dicarbaundecaborate,
4-carbanonaborane(14),
bis(tri(butyl)ammonium)nonaborate,
bis(tri(butyl)ammonium)undecaborate
bis(tri(butyl)ammonium)dodecaborate,
bis(tri(butyl)ammonium)decachlorodecaborate,
tri(butyl)ammonium 1-carbadecaborate,
tri(butyl)ammonium 1-carbadodecaborate,
tri(butyl)ammonium 1-trimethylsilyl-1-carbadecaborate,
tri(butyl)ammonium bis(nonahydrido-1,3-dicarbanonaborato)-cobaltate(III),
tri(butyl)ammonium bis(undecahydrido-7,8-dicarbaundecaborato)-ferrate(III).

The support component of the catalyst system of the present invention can be any organic or inorganic, inert solid, in particular a porous support such as talc, inorganic oxides and finely divided polymer powders (e.g. polyolefins).

Suitable inorganic oxides may be found among those of elements of groups 2, 3, 4, 5, 13, 14, 15 and 16 of the Periodic Table of the Elements. Examples of oxides preferred as supports include silicon dioxide, aluminum oxide and also mixed oxides of the two elements and corresponding oxide mixtures. Other inorganic oxides which can be used either alone or in combination with the abovementioned preferred oxidic supports are, for example, MgO, $ZrO_2$, $TiO_2$ or $B_2O_3$, to name only a few.

The support materials used have a specific surface area in the range from 10 to 1000 $m^2/g$, a pore volume in the range from 0.1 to 5 ml/g and a mean particle size of from 1 to 500 µm. Preference is given to supports having a specific surface area in the range from 50 to 500 $m^2/g$, a pore volume in the range from 0.5 to 3.5 ml/g and a mean particle size in the range from 5 to 350 µm. Particular preference is given to supports having a specific surface area in the range from 200 to 400 $m^2/g$, a pore volume in the range from 0.8 to 3.0 ml/g and a mean particle size of from 10 to 200 µm.

If the support material used naturally has a low moisture content or residual solvent content, dehydration or drying before use can be omitted. If this is not the case, for example when using silica gel as support material, dehydration or drying is advisable. Thermal dehydration or drying of the support material can be carried out under reduced pressure and/or under a blanket of inert gas (e.g. nitrogen). The drying temperature is in the range from 100 to 1000° C., preferably from 200 to 800° C. The duration of the drying process can be from 1 to 24 hours. Shorter or longer drying times are possible, provided that establishment of equilibrium with the hydroxyl groups on the support surface can occur under the conditions chosen, which normally takes from 4 to 8 hours.

The support material can also be dehydrated or dried by chemical means, by reacting the adsorbed water and the hydroxyl groups on the surface with suitable passivating agents. The reaction with the passivating reagent can convert all or some of the hydroxyl groups into a form which leads to no negative interaction with the catalytically active centers. Suitable passivating agents are, for example, silicon halides and silanes, e.g. silicon tetrachloride, chlorotrimethylsilane or dimethylaminotrichlorosilane, or organometallic compounds of aluminum, boron and magnesium, e.g. trimethylaluminum, triethylaluminum, triisobutylaluminum, methylaluminoxane, triethylborane and dibutylmagnesium. The chemical dehydration or passivation of the support material is carried out, for example, by reacting a suspension of the support material in a suitable solvent with the passivating reagent in pure form or as a solution in a suitable solvent with exclusion of air and moisture. Suitable solvents are, for example, aliphatic or aromatic hydrocarbons such as pentane, hexane, heptane, toluene or xylene. Passivation is carried out at from 0° C. to 120° C., preferably from 20 to 70° C. Higher and lower temperatures are possible. The reaction time is from 30 minutes to 20 hours, preferably from 1 to 5 hours. After chemical dehydration is complete, the support material is isolated by filtration under inert conditions, washed one or more times with suitable inert solvents as have been described above and subsequently dried in a stream of inert gas or under reduced pressure.

Organic support materials such as finely divided polyolefin powders (e.g. polyethylene, polypropylene or polystyrene) can also be used and should likewise be freed of adhering moisture, solvent residues or other impurities by appropriate purification and drying operations before use.

The supported catalyst system can by definition also comprise more than one metallocene. In this case, use is made of either two or more of the novel metallocenes of the formula I or at least one novel metallocene of the formula I and at least one further metallocene. Metallocenes which can be used in this context are described, for example, in EP-A-0 485 821, DE 195 44 828 A1 or EP-A-0 576 970. They are preferably bridged bisindenyl metallocenes which are substituted in the 2 position, 2,4 positions, 2,5 positions, 2,4,5 positions, 2,4,6 positions, 2,4,7 positions, 2,4,5,6 positions or 2,5,6 positions of the indenyl ligand.

The supported catalyst system is prepared, for example, by bringing at least one of the above-described metallocene components of the formula I in a suitable solvent into contact with at least one cocatalyst component, preferably giving a soluble reaction product, an adduct or a mixture.

The composition obtained in this way is then mixed with the dehydrated or passivated support material, the solvent is removed and the resulting supported metallocene catalyst system is dried in order to ensure that all or most of the solvent is removed from the pores of the support material. The supported catalyst is obtained as a free-flowing powder.

A possible process for preparing a free-flowing and, if desired, prepolymerized supported catalyst system comprises the following steps:

a) preparation of a metallocene/cocatalyst mixture in a suitable solvent or suspension medium, with at least one metallocene component having one of the above-described structures of the formula I;

b) application of the metallocene/cocatalyst mixture to a porous, preferably inorganic, dehydrated support;

c) removal of the major part of the solvent from the resulting mixture;

d) isolation of the supported catalyst system;

e) if desired, prepolymerization of the resulting supported catalyst system using one or more olefinic monomer(s) to give a prepolymerized supported catalyst system.

The process steps a) and b) can also be combined, and all possible permutations of the order of addition of the catalyst component are possible. Furthermore, it is also possible to mix the components simultaneously.

Preferred solvents for preparing the metallocene/cocatalyst mixture are hydrocarbons and hydrocarbon mixtures which are liquid at the reaction temperature selected and in which the individual components preferably dissolves. However, the solubility of the individual components is not a prerequisite as long as it is ensured that the reaction product of metallocene and cocatalyst components is soluble in the solvent chosen. Examples of suitable solvents include alkanes such as pentane, isopentane, hexane, heptane, octane and nonane, cycloalkanes such as cyclopentane and cyclohexane, and aromatics such as benzene, toluene, ethylbenzene and diethylbenzene. Very particular preference is given to toluene.

The amounts of aluminoxane and metallocene used in the preparation of the supported catalyst system can be varied over a wide range. Preference is given to setting a molar ratio of aluminum to the transition metal in the metallocene of from 10:1 to 1000:1, very particularly preferably from 50:1 to 500:1.

In the case of methylaluminoxane, preference is given to using 30% strength toluene solutions; the use of 10% strength solutions is, however, also possible.

The metallocene can be preactivated by dissolving it in the form of a solid in a solution of the aluminoxane in a suitable solvent. It is also possible to dissolve the metallocene separately in a suitable solvent and subsequently to combine this solution with the aluminoxane solution. Preference is given to using toluene. When using a plurality of metallocenes, the dissolution procedure can be carried out separately or using the previously mixed metallocenes. The preactivation time can be from 1 minute to 200 hours. The preactivation can take place at room temperature (20° C.). The use of higher temperatures can in specific cases shorten the preactivation time necessary and effects an additional increase in activity. In this case, higher temperatures mean a range from 20 to 150° C.

The preactivated solution(s) or the metallocene/cocatalyst mixture(s) can subsequently be combined with an inert support material, preferably silica gel, in the form of a dry powder or as a suspension in one of the abovementioned solvents. The support material is preferably used as powder. The order of addition is immaterial. When using a plurality of solutions or metallocene/cocatalyst mixtures, immediate drying can also be carried out between the individual addition steps (sequential application to a support). The preactivated metallocene/cocatalyst solution(s) or the metallocene/cocatalyst mixture(s) can be added to the support material or else the support material can be introduced into the solution(s).

The volume (or the sum of the individual volumes) of the preactivated solution(s) or the metallocene/cocatalyst mixture(s) can exceed 100% of the total pore volume of the support material used or else can be up to 100% of the total pore volume.

The temperature at which the preactivated solution(s) or the metallocene/cocatalyst mixture(s) is/are brought into contact with the support material can vary in a range from 0 to 100° C. However, lower or higher temperatures are also possible.

When using a plurality of metallocenes, preference is given to applying the solutions of the metallocene(s) which is/are not according to the present invention to the support first and then applying the solution(s) of the metallocene(s) of the present invention.

Subsequently, all or most of the solvent or solvent mixture is removed from the supported catalyst system, during which the mixture can be stirred and, if desired, also heated. Preference is given to removing both the visible proportion of solvent and also the proportion present in the pores of the support material. The removal of the solvent can be carried out in a conventional way using reduced pressure and/or flushing with inert gas. During the drying procedure, the mixture can be heated until the free solvent has been removed, which usually takes from 1 to 3 hours at a preferred temperature of from 30 to 60° C. The free solvent is the visible proportion of solvent in the mixture. For the purposes of the present invention, residual solvent is the proportion which is enclosed in the pores.

As an alternative to complete removal of the solvent, the supported catalyst system can be dried only to a certain residual solvent content, with the free solvent having been completely removed. The supported catalyst system can subsequently be washed with a low-boiling hydrocarbon such as pentane or hexane and dried again.

The supported catalyst system prepared according to the present invention can either be used directly for the polymerization of olefins or be prepolymerized using one or more olefinic monomers prior to use in a polymerization process. The method of carrying out prepolymerization of supported catalyst systems is described, for example, in WO 94/28034.

As additive, a small amount of an olefin, preferably an α-olefin (for example styrene or phenyldimethylvinylsilane) as activity-promoting component or, for example, an antistatic (as described in U.S. patent application Ser. No. 08/365280 filed Dec. 28, 1994, now abandonend) can be added during or after the preparation of the supported catalyst system. The molar ratio of additive to metallocene is preferably from 1:1000 to 1000:1, very particularly preferably from 1:20 to 20:1.

The present invention also provides a process for preparing a polyolefin by polymerization of one or more olefins in the presence of the novel catalyst system comprising at least one transition metal component of the formula I. For the purposes of the present invention, the term polymerization encompasses both homopolymerization and copolymerization.

Preference is given to polymerizing olefins of the formula $R_m$—CH=CH—$R_n$, where $R_m$ and $R_n$ are identical or different and are each a hydrogen atom or a carbon-containing radical having from 1 to 20 carbon atoms, in particular from 1 to 10 carbon atoms, and $R_m$ and $R_n$ together with the atoms connecting them may form one or more rings.

Examples of such olefins are 1-olefins having 2–40 carbon atoms, preferably from 2 to 10 carbon atoms, e.g. ethene, propene, 1-butene, 1-pentene, 1-hexene, 4-methyl-1-pentene or 1-octene, styrene, dienes such as 1,3-butadiene, 1,4-hexadiene, vinylnorbornene, norbornadiene or ethylnorbornadiene and cyclic olefins such as norbornene, tetracyclododecene or methylnorbornene. In the process of the present invention, preference is given to homopolymerizing propene or ethene or copolymerizing propene with ethene and/or with one or more 1-olefins having from 4 to 20 carbon atoms, e.g. hexene, and/or one or more dienes having from 4 to 20 carbon atoms, e.g. 1,4-butadiene, norbornadiene, ethylidenenorbornene or ethylnorbornadiene. Examples of such copolymers are ethene-propene copolymers or ethene-propene-1,4-hexadiene terpolymers.

The polymerization is carried out at from −60 to 300° C., preferably from 50 to 200° C., very particularly preferably 50–100° C. The pressure is from 0.5 to 2000 bar, preferably from 5 to 100 bar.

The catalyst system can be introduced into the polymerization system in any desired way. The catalyst system is preferably introduced in the form of a powder, a suspension or a paste having an appropriate viscosity.

It is also possible for two or more catalyst systems according to the present invention or mixtures of (a) catalyst system(s) according to the present invention with at least one further catalyst system to be introduced separately or as a mixture into the polymerization.

The polymerization can be carried out in solution, in bulk, in suspension, in the gas phase or in a supercritical medium, continuously or batchwise, in one or more stages.

The catalyst system prepared according to the present invention can be used as sole catalyst component for the polymerization of olefins having from 2 to 20 carbon atoms, but is preferably used in combination with at least one alkyl compound of elements of main groups I to III of the Periodic Table, e.g. an aluminum alkyl, magnesium alkyl or lithium alkyl or an aluminoxane. The alkyl compound is added to the monomer or suspension medium and serves to purify the monomer of substances which can have an adverse effect on the catalyst activity. The amount of alkyl compound added depends on the quality of the monomers used.

If necessary, hydrogen is added as molar mass regulator and/or to increase the activity.

In addition, an antistatic can be metered into the polymerization system during the polymerization, either together with or separately from the catalyst system used. The addition of an antistatic can also be useful in a process step downstream of the polymerization in order to improve the work-up of the polymer.

The catalyst system of the present invention makes it possible to prepare polymer powders having a uniform particle morphology and containing no fines.

The catalyst systems of the present invention have a high activity and no deposits or caked material occur in the polymerization.

The catalyst system of the present invention makes it possible to obtain polymers such as polypropylene having an extraordinarily high stereospecificity and regiospecificity.

The copolymers which can be prepared using the catalyst system of the present invention have high molar masses. At the same time, such copolymers can be prepared with high productivity at industrially relevant process parameters without deposit formation by using the catalyst system of the present invention.

The polymers obtainable by the process of the present invention are particularly useful for producing hard and stiff moldings having a high tensile strength, e.g. fibers, filaments, injection-molded parts, films, sheets or large hollow bodies (e.g. pipes), and for producing copolymers having a high stiffness, high toughness, low degree of stress whitening and high transparency.

EXAMPLES

General Information

The preparation and handling of the organometallic compounds was carried out with exclusion of air and moisture under argon (Schlenk technique or glove box). All solvents required were flushed with argon and dried over molecular sieves before use.

The metallocenes used were characterized using $^1$H-NMR, $^{13}$C-NMR and IR spectroscopy.

Definitions

PP=polypropylene

MC=metallocene

Cat=supported catalyst system h=hour

Syntheses of the Complexes

Dimethylsilanediyl(2-methyl-4-thiapentalene)(2-methyl-4-(4'-tert-butylphenyl)indene) and dimethylsilanediyl(2,5-dimethyl-N-phenyl-4-azapentalene)(2-methyl-4-(4'-tert-butylphenylindene) were synthesized from 2-methyl-4-(4'-tert-butylphenyl)indene and the corresponding dimethylchlorosilanediylpentalene derivative using methods analogous to the ligand synthesis in WO 98/22486.

14 mmol of the ligand were dissolved in 70 ml of diethyl ether, admixed at room temperature with 10.5 ml of a 20% strength solution of butyllithium in toluene and the mixture was subsequently refluxed for 3 hours. The solvent was removed under reduced pressure and the residue was taken up in 50 ml of hexane and filtered through a G3 Schlenk frit, and the residue was washed with 50 ml of hexane and dried (0.1 mbar, 20° C.). The dilithium salt was added at −78° C. to a suspension of 3.2 g (14 mmol) of zirconium tetrachloride in 80 ml of methylene chloride and the mixture was warmed to room temperature over a period of 18 hours while stirring. The mixture was filtered through a G3 frit and the residue was extracted with a total of 400 ml of methylene chloride introduced a little at a time. The combined filtrates were largely freed of the solvent under reduced pressure. The orange-brown solid which precipitated from methylene chloride was isolated. The precipitate consists of racemic isomers which can be isolated by further recrystallization. In the interests of simplicity, the isomer mixture was used in the polymerization examples.

Yield of dimethylsilanediyl(2,5-dimethyl-N-phenyl-4-azapentalene)(2-methyl-4-(4'-tert-butylphenyl)indenyl)zirconium dichloride: 2.0 g (21%)

Elemental analysis: H, 6.07 (5.71); C, 62.93 (64.60); N, 2.04 (2.37).

$^1$H-NMR ($C_6D_6$), in ppm: 7.73–6.80 (m, 15H), 2.48–2.02 (m, 9H), 1.50–1.25 (m, 15H).

Yield of dimethylsilanediyl(2-methyl-4-thiapentalene)(2-methyl-4-(4'-tert-butylphenyl)indenyl)zirconium dichloride 2.3 g (27%).

Elemental analysis: H, 5.45 (5.35); C, 59.50 (57.78).

$^1$H-NMR ($C_6D_6$) in ppm: 7.81–6.79 (m, 11H), 2.45–2.15 (m, 6H), 1.50–1.22 (m, 15H).

Examples of Application to a Support and Polymerization Examples

Example 1a

Preparation of the Supported Catalyst System 62 mg (0.09 mmol) of dimethylsilanediyl(2,5-dimethyl-N-phenyl-4-azapentalene)-(2-methyl-4-(4'-tert-butylphenylindenyl)zirconium dichloride were dissolved at room temperature in 4.3 cm$^3$ (20 mmol of Al) of 30% strength methylaluminoxane solution in toluene[1]). The solution was diluted with 3.7 cm$^3$ of toluene and stirred for 1 hour at 25° C. while being protected from light. This solution was added a little at a time while stirring to 4 g of $SiO_2$[2]) and the mixture was stirred for another 10 minutes after the addition was complete. The ratio of the volume of the solution to the total pore volume of the support material was 1.25. The mixture was subsequently dried for 4 hours at 40° C. and 10$^{-3}$ mbar. This gave 5.6 g of a free-flowing powder which, according to elemental analysis, contained 0.17% by weight of Zr and 9.7% by weight of Al.

[1]) Albemarle Corporation, Baton Rouge, La., USA
[2]) Silica Typ MS 948, W. R. Grace, Davison Chemical Devision, Baltimore, Md., USA, pore volume: 1.6 ml/g, calcined at 600° C.

Polymerization

A dry 16 dm$^3$ reactor which had been flushed firstly with nitrogen and subsequently with propene was charged with 10 dm$^3$ of liquid propene. 8 cm$^3$ of 20% strength triethylaluminum solution in Varsol (Witco) were added as scavenger and the mixture was stirred at 30° C. for 15 minutes. A suspension of 1 g of the supported metallocene catalyst in 20 cm$^3$ of Exxsol was subsequently introduced into the reactor, the mixture was heated to the polymerization temperature of 65° C. and the polymerization system was held at 65° C. for 1 hour. The polymerization was stopped by venting and the polymer obtained was dried under reduced pressure. This gave 1.7 kg of polypropylene powder having a bulk density of 460 g/dm$^3$.

The catalyst activity was 1.7 kg of PP/(g of cat×h). The polymer was a free-flowing powder and contained neither fines nor agglomerates. Inspection of the reactor indicated that it was free of deposits.

Example 1b

Application to a Support

The procedure for application to a support of Example 1a was repeated using 124 mg (0.18 mmol) of dimethylsilanediyl(2,5-dimethyl-N-phenyl-4-azapentalene) (2-methyl-4-(4'-tert-butylphenylindenyl)zirconium dichloride. This gave 5.7 g of a free-flowing powder which, according to elemental analysis, contained 0.31% by weight of Zr and 9.6% by weight of Al.

Polymerization

The procedure of Example 1a was repeated. This gave 3.1 kg of polypropylene powder having a bulk density of 462 g/dm$^3$. The catalyst activity was 3.1 kg of PP/(g of cat×h).

The polymer was a free-flowing powder and contained neither fines nor agglomerates. Inspection of the reactor indicated that it was free of deposits.

Example 2a
Application to a Support

The procedure for application to a support of Example 1a was repeated using 55 mg (0.09 mmol) of dimethylsilanediyl(2-methyl-4-thiapentalene)(2-methyl-4-(4'-tert-butylphenylindenyl)zirconium dichloride.

This gave 5.4 g of a free-flowing powder which, according to elemental analysis, contained 0.18% by weight of Zr and 10.1% by weight of Al.
Polymerization The procedure of Example 1a was repeated. This gave 1.3 kg of polypropylene powder having a bulk density of 432 g/dm$^3$. The catalyst activity was 1.3 kg of PP/(g of cat×h). The polymer was a free-flowing powder and contained neither fines nor agglomerates. Inspection of the reactor indicated that it was free of deposits.

Example 2b
Application to a Support

The procedure for application to a support of Example 1a was repeated using 110 mg (0.18 mmol) of dimethylsilanediyl(2-methyl-4-thiapentalene)(2-methyl-4-(4'-tert-butylphenylindenyl)zirconium dichloride. This gave 5.7 g of a free-flowing powder which, according to elemental analysis, contained 0.35% by weight of Zr and 9.4% by weight of Al.
Polymerization The procedure of Example 1a was repeated. This gave 2.4 kg of polypropylene powder having a bulk density of 432 g/dm$^3$. The catalyst activity was 2.4 kg of PP/(g of cat×h). The polymer was a free-flowing powder and contained neither fines nor agglomerates. Inspection of the reactor indicated that it was free of deposits.

Example 3
Application to a Support 126 mg (0.17 mmol) of the metallocene rac-dimethylsilanediylbis-(2-methyl-4-(4'-tert-butyl-phenylindenyl)zirconium dichloride were dissolved at room temperature in 3.0 cm$^3$ (14 mmol of Al) of a 30% strength solution of methylaluminoxane in toluene[1]), the solution was diluted with 2.5 cm$^3$ of toluene and was stirred at 25° C. for 1 hour while being protected from light (solution A). In parallel thereto, 21 mg (0.03 mmol) of the metallocene dimethylsilanediyl(2,5-dimethyl-N-phenyl-4-azapentalene)(2-methyl-4-(4'-tert-butylphenylindenyl)zirconium dichloride were dissolved at room temperature in 1.5 cm$^3$ (7 mmol of Al) of a 30% strength solution of methylaluminoxane in toluene[1]), the solution was diluted with 1.0 cm$^3$ of toluene and stirred at 25° C. for 1 hour while being protected from light (solution B).

Solution A was added a little at a time while stirring to 4 g of SiO$_2$[2]). After the addition was complete, the mixture was stirred for another 10 minutes. Solution B was subsequently added, likewise a little at a time, while stirring. After the addition was complete, the mixture was likewise stirred for another 10 minutes. The ratio of the sum of the volume of solution A plus the volume of solution B to the total pore volume of the support material was 1.25. The mixture was subsequently dried for 4 hours at 40° C. and 10$^{-3}$ mbar. This gave 5.7 g of a free-flowing powder which, according to elemental analysis, contained 0.36% by weight of Zr and 9.9% by weight of Al.

1) Albemarle Corporation, Baton Rouge, La., USA
2) Silica Typ MS 948, W. R. Grace, Davison Chemical Division, Baltimore, Md., USA, pore volume 1.6 ml/g, calcined at 600° C.
Polymerization The procedure of Example 1a was repeated, but the polymerization was stopped after 30 minutes because of the high catalyst activity. This gave 1.8 kg of polypropylene powder having a bulk density of 450 g/dm$^3$. The catalyst activity was 3.6 kg of PP/(g of cat×h). The polymer was a free-flowing powder and contained neither fines nor agglomerates. Inspection of the reactor indicated that it was free of deposits.

Example 4
Polymerization

A dry 24 dm$^3$ reactor which had been flushed firstly with nitrogen and subsequently with propene was charged with 12 dm$^3$ of liquid propene, 0.25 standard dm$^3$ of hydrogen and 50 g of ethylene. 4 cm$^3$ of a 20% strength solution of triethylaluminum in Varsol (Witco) were added as scavenger and the mixture was stirred at 30° C. for 5 minutes. A suspension of 1 g of the supported metallocene catalyst from Example 2b (application to a support) in 20 cm$^3$ of Exxsol was subsequently introduced into the reactor, the mixture was heated to the polymerization temperature of 65° C. and the polymerization system was held at 65° C. for 30 minutes. The polymerization was stopped by venting and the copolymer obtained was dried under reduced pressure. This gave 1.35 kg of free-flowing, agglomerate-free powder having a bulk density of 445 g/dm$^3$. The copolymer contained 3.5% by weight of randomly incorporated ethylene.

The catalyst activity was 2.7 kg of copolymer/(g of cat×h). Inspection of the reactor indicated that it was free of deposits.

Example 5
Polymerization

A dry 24 dm$^3$ reactor which had been flushed firstly with nitrogen and subsequently with propene was charged with 12 dm$^3$ of liquid propene, 0.25 standard dm$^3$ of hydrogen and 50 g of ethylene. 4 cm$^3$ of a 20% strength solution of triethylaluminum in Varsol (Witco) were added as scavenger and the mixture was stirred at 30° C. for 5 minutes. A suspension of 1 g of the supported metallocene catalyst from Example 3 (application to a support) in 20 cm$^3$ of Exxsol was subsequently introduced into the reactor, the mixture was heated to the polymerization temperature of 60° C. and the polymerization system was held at 60° C. for 30 minutes. The polymerization was stopped by venting and the copolymer obtained was dried under reduced pressure. This gave 1.4 kg of free-flowing, agglomerate-free powder having a bulk density of 430 g/dm$^3$. The copolymer contained 3.3% by weight of randomly incorporated ethylene. The catalyst activity was 2.8 kg of copolymer/(g of cat×h). Inspection of the reactor indicated that it was free of deposits.

Example 6
Polymerization

A dry 24 dm$^3$ reactor which had been flushed firstly with nitrogen and subsequently with propene was charged with 10 dm$^3$ of liquid propene and 5 standard dm$^3$ of hydrogen. 6 cm$^3$ of a 20% strength solution of triisobutylaluminum in Varsol (Witco) were added as scavenger and the mixture was stirred at 30° C. for 5 minutes. A suspension of 0.5 g of the supported metallocene catalyst from Example 3 (application to a support) was subsequently rinsed into the reactor by means of 2 dm$^3$ of liquid propene via a pressure lock. The mixture was then heated to the polymerization temperature of 75° C. (7.5° C./min, in situ prepolymerization) and the polymerization system was held at this temperature for 1 hour.

The reactor was subsequently depressurized to 10 bar and 25 bar of ethylene were injected. The mixture was polymerized further at 60° C. for 1 hour. The polymerization was stopped by venting and the block copolymer obtained was dried under reduced pressure. This gave 3.2 kg of free-flowing agglomerate-free powder having a bulk density of 440 g/dm$^3$. The rubber prepared in the second polymerization step (ethylene-propylene copolymer) contained 39% by weight of ethylene and had a glass transition temperature of −50° C. Inspection of the reactor indicated that it was free of deposits.

Comparative Example 1a
Application to a Support

The procedure for application to a support of Example 1a was repeated using 57 mg (0.09 mmol) of dimethylsilanediylbis-(2,5-dimethyl-N-phenyl-4-azapentalene)zirconium dichloride. This gave 5.6 g of a free-flowing powder which, according to elemental analysis, contained 0.18% by weight of Zr and 9.8% by weight of Al.
Polymerization The procedure of Example 1a was repeated. This gave a wax-like polymer mass, some of which remained stuck to stirrer blades and reactor walls. The polymerization activity was not determined.

Comparative Example 1b
Application to a Support

The procedure for application to a support of Example 1a was repeated using 114 mg (0.18 mmol) of dimethylsilanediylbis-(2,5-dimethyl-N-phenyl-4-azapentalene)zirconium dichloride. This gave 5.5 g of a free-flowing powder which, according to elemental analysis, contained 0.38% by weight of Zr and 9.4% by weight of Al.
Polymerization The procedure of Example 1a was repeated. This gave a wax-like polymer mass, some of which remained stuck to stirrer blades and reactor walls. The polymerization activity was not determined.

Comparative Example 2a
Application to a Support

The procedure for application to a support of Example 1a was repeated using 55 mg (0.09 mmol) of dimethylsilanediyl(2-methylindenyl)(2-methyl-4-(4'-tert-butylphenylindenyl)zirconium dichloride. This gave 5.7 g of a free-flowing powder which, according to elemental analysis, contained 0.17% by weight of Zr and 10.0% by weight of Al.
Polymerization The procedure of Example 1a was repeated. This gave 1.4 kg of polypropylene powder having a bulk density of 445 g/dm$^3$.

The catalyst activity was 1.4 kg of PP/(g of cat×h). The polymer was a free-flowing powder and contained neither fines nor agglomerates. Inspection of the reactor indicated that it was free of deposits.

Comparative Example 2b
Application to a Support

The procedure for application to a support of Example 1a was repeated using 110 mg (0.18 mmol) of dimethylsilanediyl(2-methylindenyl)(2-methyl-4-(4'-tert-butylphenylindenyl)zirconium dichloride. This gave 5.5 g of a free-flowing powder which, according to elemental analysis, contained 0.40% by weight of Zr and 10.1% by weight of Al.
Polymerization The procedure of Example 1a was repeated. This gave 2.5 kg of polypropylene powder having a bulk density of 400 g/dm$^3$. The catalyst activity was 2.5 kg of PP/(g of cat×h). The polymer contained 9.5% by weight of agglomerates. Inspection of the reactor revealed deposits on the reactor wall and on the stirrer blades.

Comparative Example 3a
Application to a Support

The procedure for application to a support of Example 1a was repeated using 67 mg (0.09 mmol) of rac-dimethylsilanediylbis-(2-methyl-4-(4'-tert-butylphenylindenyl)zirconium dichloride. This gave 5.8 g of a free-flowing powder which, according to elemental analysis, contained 0.18% by weight of Zr and 9.6% by weight of Al.
Polymerization The procedure of Example 1a was repeated. This gave 1.7 kg of polypropylene powder having a bulk density of 475 g/dm$^3$. The catalyst activity was 1.7 kg of PP/(g of cat×h). The polymer was a free-flowing powder and contained neither fines nor agglomerates. Inspection of the reactor indicated that it was free of deposits.

Comparative Example 3b
Application to a Support

The procedure for application to a support of Example 1a was repeated using 134 mg (0.18 mmol) of rac-dimethylsilanediylbis-(2-methyl-4-(4'-tert-butylphenylindenyl)zirconium dichloride. This gave 5.6 g of a free-flowing powder which, according to elemental analysis, contained 0.37% by weight of Zr and 9.9% by weight of Al.
Polymerization The procedure of Example 1a was repeated. This gave 3.2 kg of polypropylene powder having a bulk density of 440 g/dm$^3$. The catalyst activity was 3.2 kg of PP/(g of cat×h). The polymer contained about 5% by weight of agglomerates. Inspection of the reactor revealed deposits on the reactor wall and on the stirrer blades.

Comparative Example 4a
Application to a Support

The procedure for application to a support of Example 1a was repeated using 44 mg (0.09 mmol) of dimethylsilanediylbis-(2-methyl-4-thiapentalene)zirconium dichloride. This gave 5.6 g of a free-flowing powder which, according to elemental analysis, contained 0.16% by weight of Zr and 9.5% by weight of Al.
Polymerization The procedure of Example 1a was repeated. This gave a wax-like polymer mass, some of which remained stuck to stirrer blades and reactor walls. The polymerization activity was not determined.

Comparative Example 4b
Application to a Support

The procedure for application to a support of Example 1a was repeated using 88 mg (0.18 mmol) of dimethylsilanediylbis-(2-methyl-4-thiapentalene)zirconium dichloride. This gave 5.7 g of a free-flowing powder which, according to elemental analysis, contained 0.39% by weight of Zr and 9.7% by weight of Al.
Polymerization The procedure of Example 1a was repeated. This gave a wax-like polymer mass, some of which remained stuck to stirrer blades and reactor walls. The polymerization activity was not determined.

The amounts of metallocene used in the application to a support in Examples 1a to 3 and the comparative examples, the polymerization activities of the catalysts, the morphology of the polymers obtained and the respective result of the inspection for deposits are summarized in the table.

To assess the degree of immobilization of the metallocenes on the support material, the following extraction experiment was carried out:

1 g of each of the catalysts from Examples 1a, 1b and Comparative Examples 2a, 2b, 3a and 3b was in each case suspended in 20 ml of toluene, the mixture was stirred at 50° C. for 30 minutes and subsequently filtered through a G3 frit. The color of the filtrate in each case is shown in Table 1.

The filtrate from Comparative Example 2b was used in a polymerization carried out in a manner analogous to Example 1a. Subsequent inspection of the reactor revealed a thin, white deposit on stirrer and reactor walls. A sample of the deposit was dried and examined by means of IR spectroscopy. It was found to be isotactic polypropylene.

The filtrates from Examples 1a and 1b and Comparative Example 2a were likewise used for polymerization. They proved to be polymerization-inactive, and inspection of the reactor revealed no deposits.

TABLE 1

| Example | Metallo-cene | mmol of MC | kg of PP/(g of cat × h) | Polymer | Deposit | Filtrate |
|---|---|---|---|---|---|---|
| 1a | inv. | 0.09 | 1.7 | powder | no | colorless |
| 1b | inv. | 0.18 | 3.1 | powder | no | colorless |
| 2a | inv. | 0.09 | 1.3 | powder | no | |
| 2b | inv. | 0.18 | 2.4 | powder | no | |
| 3 | not inv./inv. | 0.17/0.03 | 3.6 | powder | no | |
| CE 1a | not inv. | 0.09 | not determined | wax | yes | |
| CE 1b | not inv. | 0.18 | not determined | wax | yes | |
| CE 2a | not inv. | 0.09 | 1.4 | powder | no | colorless |
| CE 2b | not inv. | 0.18 | 2.5 | powder | yes | yellow |
| CE 3a | not inv. | 0.09 | 1.7 | powder | no | colorless |
| CE 3b | not inv. | 0.18 | 3.2 | powder | yes | yellow |
| CE 4a | not inv. | 0.09 | not determined | wax | yes | |
| CE 4b | not inv. | 0.18 | not determined | wax | yes | |

CE comparative example
inv. according to the present invention
not inv. not according to the present invention

We claim:
1. A compound of the formula I,

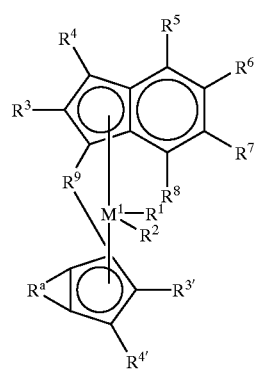

where $M^1$ is a metal of group IVb of the Periodic Table of the Elements, $R^1$ and $R^2$ are identical or different and are each a hydrogen atom, a $C_1$–$C_{10}$-alkyl group, a $C_1$–$C_{10}$-alkoxy group, a $C_6$–$C_{20}$-aryl group, a $C_6$–$C_{10}$-aryloxy group, a $C_2$–$C_{10}$-alkenyl group, an OH group, an $N(R^{12})_2$ group, where $R^{12}$ is a $C_1$–$C_{10}$-alkyl group or a $C_6$–$C_{14}$-aryl group, or a halogen atom, $R^3$, $R^4$, $R^6$, $R^7$, $R^8$, $R^{3'}$, $R^{4'}$ are identical or different, and are each a hydrogen atom, a hydrocarbon group having from 1 to 40 carbon atoms which may be partially halogenated, halogenated, linear, cyclic or branched, an $SR^{13}$ group or an $OR^{13}$ group, where $R^{13}$ is as defined for $R^4$, with the proviso that $R^3$ is not hydrogen, where $R^{3'}$ and $R^{4'}$ may also be joined to form a ring, and $R^5$ is a $C_6$–$C_{40}$-aryl group which bears a substituent $R^{14}$ in the para position relative to the point of linkage to the indenyl ring,

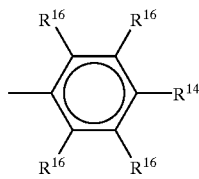

where $R^{14}$ is a halogen atom F, Cl or Br, a $C_1$–$C_{20}$-alkyl radical, a $C_2$–$C_{20}$-alkenyl radical, a $C_6$–$C_{24}$-aryl radical, a $C_7$–$C_{40}$-arylalkyl radical, a $C_7$–$C_{40}$-alkylaryl radical, a $C_8$–$C_{40}$-arylalkenyl radical, where the hydrocarbon radicals may also be halogenated or partially halogenated by fluorine, chlorine or bromine, —$N(R^{15})_2$, —$P(R^{15})_2$, —$SR^{15}$, —$OR^{15}$, —$Si(R^{15})_3$, —$[N(R^{15})_3]^+$ or —$[P(R^{15})_3]^+$, where $R^{15}$ is as defined for $R^4$, $R^{16}$ can be identical or different despite having the same index and are hydrogen or as defined for $R^{14}$ and any two adjacent radicals $R^{16}$ may also be joined to form a ring, or one or more of the radicals $R^{16}$ together with the radicals $R^6$ or $R^4$ and/or $R^{14}$ form a ring, with the proviso that $R^{14}$ may also be hydrogen when at least one of the radicals $R^{16}$ is different from hydrogen, $R^9$ is a bridge

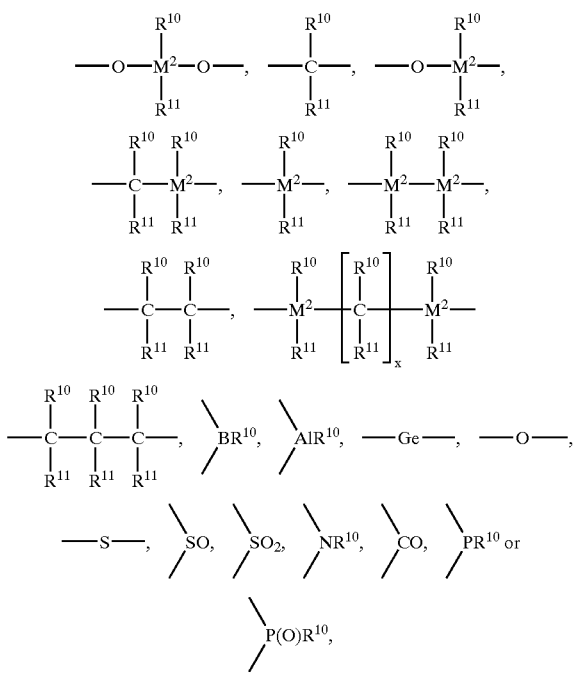

where $R^{10}$, $R^{11}$ can be identical or different, even when having the same index, and are each a hydrogen atom, a halogen atom, a heteroatom-containing $C_1$–$C_{40}$-hydrocarbon group, a $C_1$–$C_{40}$-hydrocarbon group, $-N(R^{17})_2$, $-P(R^{17})_2$, $-SR^{17}$, $-OR^{17}$, $-Si(R^{17})_3$, $-[N(R^{17})_3]^+$ or $-[P(R^{17})_3]^+$ where $R^{17}$ is as defined for $R^4$, or $R^{10}$ and $R^{11}$ in each case together with the atoms connecting them form one or more rings, X is an integer from 0 to 18, $M^2$ is silicon, germanium or tin, and $R^9$ may also link two units of the formula I to one another, $R^\alpha$ together with the cyclopentadienyl ring to which it is bound forms one of the molecular fragments

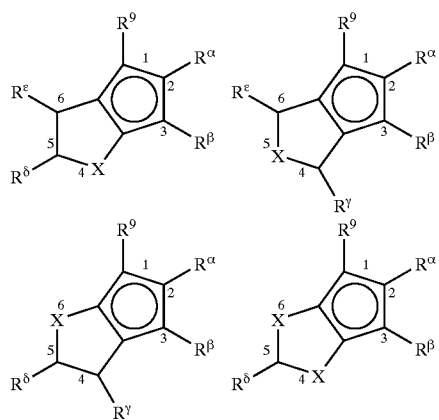

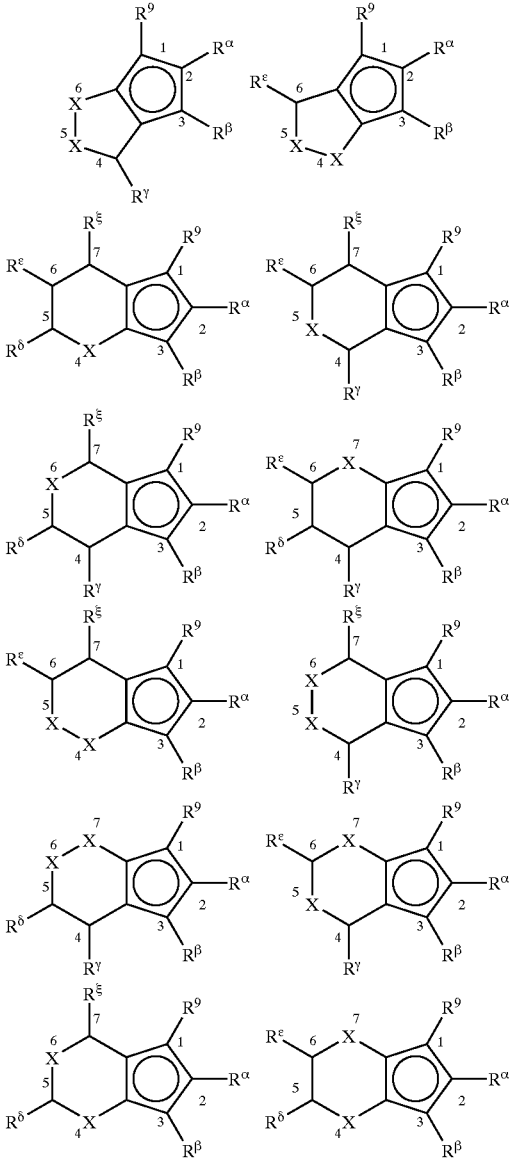

where the heteroatom functions X are identical or different and are $NR^\lambda$, $PR^\lambda$, N, O or S, the radicals $R^\gamma$, $R^\delta$, $R^\epsilon$, $R^\xi$ and $R^\lambda$ are hydrogen or are as defined for $R^3$, the radicals $R^\alpha$ are as defined for $R^{3'}$ and the radicals $R^\beta$ are as defined for $R^{4'}$.

2. A compound of the formula I as claimed in claim 1, wherein the hydrocarbon group described in the definition of $R^3$, $R^4$, $R^6$, $R^7$, $R^8$, $R^{3'}$, $R^{4'}$ is a $C_1$–$C_{10}$-alkyl group, a $C_2$–$C_{10}$-alkenyl group, a $C_6$–$C_{20}$-aryl group, a $C_7$–$C_{40}$-arylalkyl group, a $C_7$–$C_{40}$-alkylaryl group or a $C_8$–$C_{40}$-arylalkenyl group.

3. A compound of the formula I as claimed in claim 1, wherein the carbon-containing group described in the definition of $R^{10}$, $R^{11}$ is a $C_1$–$C_{20}$-alkyl group, a $C_1$–$C_{10}$-fluoroalkyl group, a $C_1$–$C_{10}$-alkoxy group, a $C_6$–$C_{14}$-aryl group, a $C_6$–$C_{10}$-fluoroaryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group.

4. A compound of the formula I as claimed in claim 1, wherein $M^1$ is zirconium, hafnium or titanium, $R^1$, $R^2$ are identical and are methyl, dimethylamide, dibenzyl or chlorine, $R^3$, $R^{3'}$ are identical or different and are each a $C_1$–$C_{10}$-alkyl group, a $C_2$–$C_{10}$-alkenyl group or a $C_7$–$C_{40}$-alkylaryl group, $R^9$ is $R^{10}R^{11}Si=$, $R^{10}R^{11}Ge=$, $R^{10}R^{11}C=$ or $—(R^{10}R^{11}C—CR^{10}R^{11})—$, where $R^{10}$ and $R^{11}$ are identical or different and are each hydrogen, a $C_1$–$C_{10}$-alkyl or $C_6$–$C_{14}$-aryl group, $R^5$ is a $C_6$–$C_{20}$-aryl group which bears a substituent $R^{14}$ in the para position relative to the point of linkage to the indenyl ring, and $R^{14}$ is a $C_1$–$C_{10}$-alkyl radical, a $C_2$–$C_{10}$-alkenyl radical, a $C_6$–$C_{18}$-aryl radical, a $C_7$–$C_{20}$-arylalkyl radical, a $C_7$–$C_{20}$-alkylaryl radical, a $C_8$–$C_{20}$-arylalkenyl radical, where the hydrocarbon radicals may also be halogenated or partially halogenated by fluorine and/or chlorine, $—NR_2^{15}$, $—P(R^{15})_2$, $—SR^{15}$, $—Si(R^{15})_3$, $—[N(R^{15})_3]^+$ or $—[P(R^{15})_3]^+$, where $R^{15}$ is as defined for $R^4$, $R^{16}$ are identical or different and are each fluorine, chlorine, hydrogen, a $C_1$–$C_{10}$-alkyl radical which may also be halogenated or partially halogenated by fluorine and/or chlorine, a $C_6$–$C_{18}$-aryl radical or a $C_2$–$C_{10}$-alkenyl radical, or adjacent radicals $R^{16}$ may be joined to form a ring.

5. A compound of the formula I as claimed in claim 1, wherein $M^1$ is zirconium, $R^1$, $R^2$ are identical and are methyl or chlorine, $R^9$ is $R^{10}R^{11}Si=$, $R^{10}R^{11}C=$ or $—(R^{10}R^{11}C—CR^{10}R^{11})—$, where $R^{10}$ and $R^{11}$ are identical or different and are hydrogen, phenyl, methyl or ethyl, and the radicals $R^4$, $R^6$, $R^7$ and $R^8$ and also $R^{4'}$ are hydrogen, $R^5$ is a phenyl, naphthyl or anthracenyl group, which bears a substituent $R^{14}$ in the para position relative to the point of linkage to the indenyl ring, where $R^{14}$ is an $SiR_3^{15}$ radical, where $R^{15}$ is as defined for $R^4$, or a linear $C_1$–$C_{10}$-alkyl radical, a branched $C_3$–$C_{10}$-alkyl radical, a $C_2$–$C_{10}$-alkenyl radical or a branched $C_7$–$C_{20}$-alkyaryl radical, where the hydrocarbon radicals may also be halogenated or partially halogenated by fluorine or chlorine.

6. A compound of the formula I as claimed in claim 1, wherein $M^1R^1R^2$: $ZrCl_2$, $Zr(CH_3)_2$, $R^3$, $R^{3'}$: is methyl, ethyl, n-propyl, isopropyl, isobutyl, n-butyl, s-butyl, $R^4$, $R^8$, $R^{4'}$: hydrogen $R^6$, $R^7$: hydrogen, $C_1$–$C_4$-alkyl, $C_6$–$C_{10}$-aryl, $R^5$ : p-methylphenyl, p-ethylphenyl, p-n-propylphenyl, p-isopropylphenyl, p-n-butylphenyl, p-tert-butylphenyl, p-s-butylphenyl, p-pentylphenyl, p-hexylphenyl, p-cyclohexylphenyl, p-trimethylsilylphenyl, p-adamantylphenyl, p-$(F_3C)_3$C-phenyl, $R^9$: dimethylsilanediyl, phenyl(methyl)silanediyl, diphenylsilanediyl, dimethylgermanediyl, ethylidene, 1-methylethylidene, 1,1-dimethylethylidene, 1,2-dimethylethylidene, 1,1,2,2-tetramethylethylidene, dimethylmethylidene, phenyl(methyl)methylidene, diphenylmethylidene, diphenylmethylidene, Ra: 2-alkyl-4-azapentalenes, 2-alkyl-5-azapentalenes, 2-alkyl-6-azapentalenes, 2-alkyl-N-aryl-4-azapentalenes, 2 -alkyl-N-aryl-5-azapentalenes, 2-alkyl-N-aryl-6-azapentalenes, 2,5-dialkyl-4-azapentalenes, 2,5-dialkyl-6-azapentalenes, 2,5-dialkyl-N-aryl-4-azapentalenes, 2,5-dialkyl-N-aryl-6-azapentalenes, 2-alkyl-4-phosphapentalenes, 2-alkyl-5-phosphapentalenes, 2-alkyl-6-phosphapentalenes, 2 -alkyl-P-aryl-4-phosphapentalenes, 2-alkyl-P-aryl-5-phosphapentalenes, 2-alkyl-P-aryl-6-phosphapentalenes, 2,5-dialkyl-4-phosphapentalenes, 2,5-dialkyl-6-phosphapentalenes, 2,5-dialkyl- P-aryl-4-phosphapentalenes, 2,5-dialkyl-P-aryl-6-phosphapentalenes, 2-alkyl-4-thiapentalenes, 2-alkyl-5-thiapentalenes, 2-alkyl-6-thiapentalenes, 2,5-dialkyl-4-thiapentalenes, 2,5-dialkyl-6-thiapentalenes, 2-alkyl-4-oxapentalenes, 2-alkyl-5-oxapentalenes, 2-alkyl-6-oxapentalenes, 2,5-dialkyl-4-oxapentalenes or 2,5-dialkyl-6-oxapentalenes.

7. A compound of the formula I as claimed in claim 1 which is dimethylsilanediyl(2-methyl-4-azapentalene)(2-methyl-4-(4'-methylphenylindenyl)zirconium dichloride dimethylsilanediyl(2-methyl-5-azapentalene)(2-methyl-4-(4'-methylphenylindenyl)zirconium dichloride dimethylsilanediyl(2-methyl-6-azapentalene)(2-methyl-4-(4'-methylphenylindenyl)zirconium dichloride dimethylsilanediyl(2-methyl-N-phenyl-4-azapentalene)(2-methyl-4-(4'-methylphenylindenyl)zirconium dichloride dimethylsilanediyl(2-methyl-N-phenyl-5-azapentalene)(2-methyl-4-(4'-methylphenylindenyl)zirconium dichloride dimethylsilanediyl(2-methyl-N-phenyl-6-azapentalene)(2-methyl-4-(4'-methylphenylindenyl)zirconium dichloride dimethylsilanediyl(2,5-dimethyl-4-azapentalene)(2-methyl-4-(4'-methylphenylindenyl)zirconium dichloride dimethylsilanediyl(2,5-dimethyl-6-azapentalene)(2-methyl-4-(4'-methylphenylindenyl)zirconium dichloride dimethylsilanediyl(2,5-dimethyl-N-phenyl-4-azapentalene)-(2-methyl-4-(4'-methylphenylindenyl)zirconium dichloride dimethylsilanediyl(2,5-dimethyl-N-phenyl-6-azapentalene)-(2-methyl-4-(4'-methylphenylindenyl)zirconium dichloride dimethylsilanediyl(2-methyl-4-thiapentalene)(2-methyl-4-(4'-methylphenylindenyl)zirconium dichloride dimethylsilanediyl(2-methyl-5-thiapentalene)(2-methyl-4-(4'-methylphenylindenyl)zirconium dichloride dimethylsilanediyl(2-methyl-6-thiapentalene)(2-methyl-4-(4'-methylphenylindenyl)zirconium dichloride dimethylsilanediyl(2,5-dimethyl-4-thiapentalene)(2-methyl-4-(4'-methylphenylindenyl)zirconium dichloride dimethylsilanediyl(2,5-dimethyl-6-thiapentalene)(2-methyl-4-(4'-methylphenylindenyl)zirconium dichloride dimethylsilanediyl(2-methyl-4-oxapentalene)(2-methyl-4-(4'-methylphenylindenyl)zirconium dichloride dimethylsilanediyl(2-methyl-5-oxapentalene)(2-methyl-4-(4'-methylphenylindenyl)zirconium dichloride dimethylsilanediyl(2-methyl-6-oxapentalene)(2-methyl-4-(4'-methylphenylindenyl)zirconium dichloride dimethylsilanediyl(2,5-dimethyl-4-oxapentalene)(2-methyl-4-(4'-methylphenylindenyl)zirconium dichloride dimethylsilanediyl(2,5-dimethyl-6-oxapentalene)(2-methyl-4-(4'-methylphenylindenyl)zirconium dichloride dimethylsilanediyl(2-methyl-4-azapentalene)(2-methyl-4-(4'-ethyl-phenylindenyl)zirconium dichloride dimethylsilanediyl(2-methyl-5-azapentalene)(2-methyl-4-(4'-ethyl-phenylindenyl)zirconium dichloride dimethylsilanediyl(2-methyl-6-azapentalene)(2-methyl-4-(4'-ethyl-phenylindenyl)zirconium dichloride dimethylsilanediyl(2-methyl-N-phenyl-4-azapentalene)(2-methyl-4-(4'-ethylphenylindenyl)zirconium dichloride
dimethylsilanediyl(2-methyl-N-phenyl-5-azapentalene)(2-methyl-4-(4'-ethylphenylindenyl)zirconium dichloride
dimethylsilanediyl(2-methyl-N-phenyl-6-azapentalene)(2-methyl-4-(4'-ethylphenylindenyl)zirconium dichloride
dimethylsilanediyl(2,5-dimethyl-4-azapentalene)(2-methyl-4-(4'-ethylphenylindenyl)zirconium dichloride
dimethylsilanediyl(2,5-dimethyl-6-azapentalene)(2-methyl-4-(4'-ethylphenylindenyl)zirconium dichloride
dimethylsilanediyl(2,5-dimethyl-N-phenyl-4-azapentalene)-(2-methyl-4-(4'-ethylphenylindenyl)zirconium dichloride
dimethylsilanediyl(2,5-dimethyl-N-phenyl-6-azapentalene)-(2-methyl-4-(4'-ethylphenylindenyl)zirconium dichloride
dimethylsilanediyl(2-methyl-4-thiapentalene)(2-methyl-4-(4'-ethylphenylindenyl)zirconium dichloride
dimethylsilanediyl(2-methyl-5-thiapentalene)(2-methyl-4-(4'-ethylphenylindenyl)zirconium dichloride
dimethylsilanediyl(2-methyl-6-thiapentalene)(2-methyl-4-(4'-ethylphenylindenyl)zirconium dichloride
dimethylsilanediyl(2,5-dimethyl-4-thiapentalene)(2-methyl-4-(4'-ethylphenylindenyl)zirconium dichloride
dimethylsilanediyl(2,5-dimethyl-6-thiapentalene)(2-methyl-4-(4'-ethylphenylindenyl)zirconium dichloride
dimethylsilanediyl(2-methyl-4-oxapentalene)(2-methyl-4-(4'-ethyl-phenylindenyl)zirconium dichloride
dimethylsilanediyl(2-methyl-5-oxapentalene)(2-methyl-4-(4'-ethyl-phenylindenyl)zirconium dichloride
dimethylsilanediyl(2-methyl-6-oxapentalene)(2-methyl-4-(4'-ethyl-phenylindenyl)zirconium dichloride
dimethylsilanediyl(2,5-dimethyl-4-oxapentalene)(2-methyl-4-(4'-ethylphenylindenyl)zirconium dichloride
dimethylsilanediyl(2,5-dimethyl-6-oxapentalene)(2-methyl-4-(4'-ethylphenylindenyl)zirconium dichloride
dimethylsilanediyl(2-methyl-4-azapentalene)(2-methyl-4-(4'-n-pro-pylphenylindenyl)zirconium dichloride
dimethylsilanediyl(2-methyl-5-azapentalene)(2-methyl-4-(4'-n-pro-pylphenylindenyl)zirconium dichloride
dimethylsilanediyl(2-methyl-6-azapentalene)(2-methyl-4-(4'-n-pro-pylphenylindenyl)zirconium dichloride
dimethylsilanediyl(2-methyl-N-phenyl-4-azapentalene)(2-methyl-4-(4'-n-propylphenylindenyl)zirconium dichloride
dimethylsilanediyl(2-methyl-N-phenyl-5-azapentalene)(2-methyl-4-(4'-n-propylphenylindenyl)zirconium dichloride
dimethylsilanediyl(2-methyl-N-phenyl-6-azapentalene)(2-methyl-4-(4'-n-propylphenylindenyl)zirconium dichloride
dimethylsilanediyl(2,5-dimethyl-4-azapentalene)(2-methyl-4-(4'-n-propylphenylindenyl)zirconium dichloride
dimethylsilanediyl(2,5-dimethyl-6-azapentalene)(2-methyl-4-(4'-n-propylphenylindenyl)zirconium dichloride
dimethylsilanediyl(2,5-dimethyl-N-phenyl-4-azapentalene)-(2-methyl-4-(4'-n-propylphenylindenyl)zirconium dichloride
dimethylsilanediyl(2,5-dimethyl-N-phenyl-6-azapentalene)-(2-methyl-4-(4'-n-propylphenylindenyl)zirconium dichloride
dimethylsilanediyl(2-methyl-4-thiapentalene)(2-methyl-4-(4'-n-propylphenylindenyl)zirconium dichloride
dimethylsilanediyl(2-methyl-5-thiapentalene)(2-methyl-4-(4'-n-propylphenylindenyl)zirconium dichloride
dimethylsilanediyl(2-methyl-6-thiapentalene)(2-methyl-4-(4'-n-propylphenylindenyl)zirconium dichloride
dimethylsilanediyl(2,5-dimethyl-4-thiapentalene)(2-methyl-4-(4'-n-propylphenylindenyl)zirconium dichloride
dimethylsilanediyl(2,5-dimethyl-6-thiapentalene)(2-methyl-4-(4'-n-propylphenylindenyl)zirconium dichloride
dimethylsilanediyl(2-methyl-4-oxapentalene)(2-methyl-4-(4'-n-propylphenylindenyl)zirconium dichloride
dimethylsilanediyl(2-methyl-5-oxapentalene)(2-methyl-4-(4'-n-propylphenylindenyl)zirconium dichloride
dimethylsilanediyl(2-methyl-6-oxapentalene)(2-methyl-4-(4'-n-propylphenylindenyl)zirconium dichloride
dimethylsilanediyl(2,5-dimethyl-4-oxapentalene)(2-methyl-4-(4'-n-propylphenylindenyl)zirconium dichloride
dimethylsilanediyl(2,5-dimethyl-6-oxapentalene)(2-methyl-4-(4'-n-propylphenylindenyl)zirconium dichloride
dimethylsilanediyl(2-methyl-4-azapentalene)(2-methyl-4-(4'-isopropylphenylindenyl)zirconium dichloride
dimethylsilanediyl(2-methyl-5-azapentalene)(2-methyl-4-(4'-isopropylphenylindenyl)zirconium dichloride
dimethylsilanediyl(2-methyl-6-azapentalene)(2-methyl-4-(4'-isopropylphenylindenyl)zirconium dichloride
dimethylsilanediyl(2-methyl-N-phenyl-4-azapentalene)(2-methyl-4-(4'-isopropylphenylindenyl)zirconium dichloride
dimethylsilanediyl(2-methyl-N-phenyl-5-azapentalene)(2-methyl-4-(4'-isopropylphenylindenyl)zirconium dichloride
dimethylsilanediyl(2-methyl-N-phenyl-6-azapentalene)(2-methyl-4-(4'-isopropylphenylindenyl)zirconium dichloride
dimethylsilanediyl(2,5-dimethyl-4-azapentalene)(2-methyl-4-(4'-isopropylphenylindenyl)zirconium dichloride
dimethylsilanediyl(2,5-dimethyl-6-azapentalene)(2-methyl-4-(4'-isopropylphenylindenyl)zirconium dichloride
dimethylsilanediyl(2,5-dimethyl-N-phenyl-4-azapentalene)-(2-methyl-4-(41-isopropylphenylindenyl)zirconium dichloride
dimethylsilanediyl(2,5-dimethyl-N-phenyl-6-azapentalene)-(2-methyl-4-(4'-isopropylphenylindenyl)zirconium dichloride
dimethylsilanediyl(2-methyl-4-thiapentalene)(2-methyl-4-(4'-isopropylphenylindenyl)zirconium dichloride
dimethylsilanediyl(2-methyl-5-thiapentalene)(2-methyl-4-(4'-isopropylphenylindenyl)zirconium dichloride
dimethylsilanediyl(2-methyl-6-thiapentalene)(2-methyl-4-(4'-isopropylphenylindenyl)zirconium dichloride
dimethylsilanediyl(2,5-dimethyl-4-thiapentalene)(2-methyl-4-(4'-isopropylphenylindenyl)zirconium dichloride
dimethylsilanediyl(2,5-dimethyl-6-thiapentalene)(2-methyl-4-(4'-isopropylphenylindenyl)zirconium dichloride
dimethylsilanediyl(2-methyl-4-oxapentalene)(2-methyl-4-(4'-isopropylphenylindenyl)zirconium dichloride
dimethylsilanediyl(2-methyl-5-oxapentalene)(2-methyl-4-(4'-isopropylphenylindenyl)zirconium dichloride
dimethylsilanediyl(2-methyl-6-oxapentalene)(2-methyl-4-(4'-isopropylphenylindenyl)zirconium dichloride
dimethylsilanediyl(2,5-dimethyl-4-oxapentalene)(2-methyl-4-(4'-isopropylphenylindenyl)zirconium dichloride
dimethylsilanediyl(2,5-dimethyl-6-oxapentalene)(2-methyl-4-(4'-isopropylphenylindenyl)zirconium dichloride
dimethylsilanediyl(2-methyl-4-azapentalene)(2-methyl-4-(4'-n-butylphenylindenyl)zirconium dichloride
dimethylsilanediyl(2-methyl-5-azapentalene)(2-methyl-4-(4'-n-butylphenylindenyl)zirconium dichloride dimethylsilanediyl(2-methyl-6-azapentalene)(2-methyl-4-(4'-n-butylphenylindenyl)zirconium dichloride
dimethylsilanediyl(2-methyl-N-phenyl-4-azapentalene)(2-methyl-4-(4'-n-butylphenylindenyl)zirconium dichloride
dimethylsilanediyl(2-methyl-N-phenyl-5-azapentalene)(2-methyl-4-(4'-n-butylphenylindenyl)zirconium dichloride
dimethylsilanediyl(2-methyl-N-phenyl-6-azapentalene)(2-methyl-4-(4'-n-butylphenylindenyl)zirconium dichloride
dimethylsilanediyl(2,5-dimethyl-4-azapentalene)(2-methyl-4-(4'-n-butylphenylindenyl)zirconium dichloride
dimethylsilanediyl(2,5-dimethyl-6-azapentalene)(2-methyl-4-(4'-n-butylphenylindenyl)zirconium dichloride
dimethylsilanediyl(2,5-dimethyl-N-phenyl-4-azapentalene)-(2-methyl-4-(4'-n-butylphenylindenyl)zirconium dichloride
dimethylsilanediyl(2,5-dimethyl-N-phenyl-6-azapentalene)-(2-methyl-4-(4'-n-butylphenylindenyl)zirconium dichloride
dimethylsilanediyl(2-methyl-4-thiapentalene)(2-methyl-4-(4'-n-butylphenylindenyl)zirconium dichloride
dimethylsilanediyl(2-methyl-5-thiapentalene)(2-methyl-4-(4'-n-butylphenylindenyl)zirconium dichloride
dimethylsilanediyl(2-methyl-6-thiapentalene)(2-methyl-4-(4'-n-butylphenylindenyl)zirconium dichloride
dimethylsilanediyl(2,5-dimethyl-4-thiapentalene)(2-methyl-4-(4'-n-butylphenylindenyl)zirconium dichloride
dimethylsilanediyl(2,5-dimethyl-6-thiapentalene)(2-methyl-4-(4'-n-butylphenylindenyl)zirconium dichloride
dimethylsilanediyl(2-methyl-4-oxapentalene)(2-methyl-4-(4'-n-butylphenylindenyl)zirconium dichloride
dimethylsilanediyl(2-methyl-5-oxapentalene)(2-methyl-4-(4'-n-butylphenylindenyl)zirconium dichloride
dimethylsilanediyl(2-methyl-6-oxapentalene)(2-methyl-4-(4'-n-butylphenylindenyl)zirconium dichloride
dimethylsilanediyl(2,5-dimethyl-4-oxapentalene)(2-methyl-4-(4'-n-butylphenylindenyl)zirconium dichloride
dimethylsilanediyl(2,5-dimethyl-6-oxapentalene)(2-methyl-4-(4'-n-butylphenylindenyl)zirconium dichloride
dimethylsilanediyl(2-methyl-4-azapentalene)(2-methyl-4-(4'-s-butylphenylindenyl)zirconium dichloride
dimethylsilanediyl(2-methyl-5-azapentalene)(2-methyl-4-(4'-s-butylphenylindenyl)zirconium dichloride
dimethylsilanediyl(2-methyl-6-azapentalene)(2-methyl-4-(4'-s-butylphenylindenyl)zirconium dichloride
dimethylsilanediyl(2-methyl-N-phenyl-4-azapentalene)(2-methyl-4-(4'-s-butylphenylindenyl)zirconium dichloride
dimethylsilanediyl(2-methyl-N-phenyl-5-azapentalene)(2-methyl-4-(4'-s-butylphenylindenyl)zirconium dichloride
dimethylsilanediyl(2-methyl-N-phenyl-6-azapentalene)(2-methyl-4-(4'-s-butylphenylindenyl)zirconium dichloride
dimethylsilanediyl(2,5-dimethyl-4-azapentalene)(2-methyl-4-(4'-s-butylphenylindenyl)zirconium dichloride
dimethylsilanediyl(2,5-dimethyl-6-azapentalene)(2-methyl-4-(4'-s-butylphenylindenyl)zirconium dichloride
dimethylsilanediyl(2,5-dimethyl-N-phenyl-4-azapentalene)-(2-methyl-4-(4'-s-butylphenylindenyl)zirconium dichloride
dimethylsilanediyl(2,5-dimethyl-N-phenyl-6-azapentalene)-(2-methyl-4-(4'-s-butylphenylindenyl)zirconium dichloride
dimethylsilanediyl(2-methyl-4-thiapentalene)(2-methyl-4-(4'-s-butylphenylindenyl)zirconium dichloride
dimethylsilanediyl(2-methyl-5-thiapentalene)(2-methyl-4-(4'-s-butylphenylindenyl)zirconium dichloride
dimethylsilanediyl(2-methyl-6-thiapentalene)(2-methyl-4-(4'-s-butylphenylindenyl)zirconium dichloride
dimethylsilanediyl(2,5-dimethyl-4-thiapentalene)(2-methyl-4-(4'-s-butylphenylindenyl)zirconium dichloride
dimethylsilanediyl(2,5-dimethyl-6-thiapentalene)(2-methyl-4-(4'-s-butylphenylindenyl)zirconium dichloride
dimethylsilanediyl(2-methyl-4-oxapentalene)(2-methyl-4-(4'-s-butylphenylindenyl)zirconium dichloride
dimethylsilanediyl(2-methyl-5-oxapentalene)(2-methyl-4-(4'-s-butylphenylindenyl)zirconium dichloride
dimethylsilanediyl(2-methyl-6-oxapentalene)(2-methyl-4-(4'-s-butylphenylindenyl)zirconium dichloride
dimethylsilanediyl(2,5-dimethyl-4-oxapentalene)(2-methyl-4-(4'-s-butylphenylindenyl)zirconium dichloride
dimethylsilanediyl(2,5-dimethyl-6-oxapentalene)(2-methyl-4-(4'-s-butylphenylindenyl)zirconium dichloride
dimethylsilanediyl(2-methyl-4-azapentalene)(2-methyl-4-(4'-tert-butylphenylindenyl)zirconium dichloride
dimethylsilanediyl(2-methyl-5-azapentalene)(2-methyl-4-(4'-tert-butylphenylindenyl)zirconium dichloride
dimethylsilanediyl(2-methyl-6-azapentalene)(2-methyl-4-(4'-tert-butylphenylindenyl)zirconium dichloride
dimethylsilanediyl(2-methyl-N-phenyl-4-azapentalene)(2-methyl-4-(4'-tert-butylphenylindenyl)zirconium dichloride
dimethylsilanediyl(2-methyl-N-phenyl-5-azapentalene)(2-methyl-4-(4'-tert-butylphenylindenyl)zirconium dichloride
dimethylsilanediyl(2-methyl-N-phenyl-6-azapentalene)(2-methyl-4-(4'-tert-butylphenylindenyl)zirconium dichloride
dimethylsilanediyl(2,5-dimethyl-4-azapentalene)(2-methyl-4-(4'-tert-butylphenylindenyl)zirconium dichloride
dimethylsilanediyl(2,5-dimethyl-6-azapentalene)(2-methyl-4-(4'-tert-butylphenylindenyl)zirconium dichloride
dimethylsilanediyl(2,5-dimethyl-N-phenyl-4-azapentalene)-(2-methyl-4-(4'-tert-butylphenylindenyl)zirconium dichloride
dimethylsilanediyl(2,5-dimethyl-N-phenyl-6-azapentalene)-(2-methyl-4-(4'-tert-butylphenylindenyl)zirconium dichloride
dimethylsilanediyl(2-methyl-4-thiapentalene)(2-methyl-4-(4'-tert-butylphenylindenyl)zirconium dichloride
dimethylsilanediyl(2-methyl-5-thiapentalene)(2-methyl-4-(4'-tert-butylphenylindenyl)zirconium dichloride
dimethylsilanediyl(2-methyl-6-thiapentalene)(2-methyl-4-(4'-tert-butylphenylindenyl)zirconium dichloride
dimethylsilanediyl(2,5-dimethyl-4-thiapentalene)(2-methyl-4-(4'-tert-butylphenylindenyl)zirconium dichloride
dimethylsilanediyl(2,5-dimethyl-6-thiapentalene)(2-methyl-4-(4'-tert-butylphenylindenyl)zirconium dichloride
dimethylsilanediyl(2-methyl-4-oxapentalene)(2-methyl-4-(4'-tert-butylphenylindenyl)zirconium dichloride
dimethylsilanediyl(2-methyl-5-oxapentalene)(2-methyl-4-(4'-tert-butylphenylindenyl)zirconium dichloride
dimethylsilanediyl(2-methyl-6-oxapentalene)(2-methyl-4-(4'-tert-butylphenylindenyl)zirconium dichloride
dimethylsilanediyl(2,5-dimethyl-4-oxapentalene)(2-methyl-4-(4'-tert-butylphenylindenyl)zirconium dichloride
dimethylsilanediyl(2,5-dimethyl-6-oxapentalene)(2-methyl-4-(4'-tert-butylphenylindenyl)zirconium dichloride
dimethylsilanediyl(2-methyl-4-azapentalene)(2-methyl-4-(4'-n-pentylphenylindenyl)zirconium dichloride
dimethylsilanediyl(2-methyl-5-azapentalene)(2-methyl-4-(4'-n-pentylphenylindenyl)zirconium dichloride
dimethylsilanediyl(2-methyl-6-azapentalene)(2-methyl-4-(4'-n-pentylphenylindenyl)zirconium dichloride
dimethylsilanediyl(2-methyl-N-phenyl-4-azapentalene)(2-methyl-4-(4'-n-pentylphenylindenyl)zirconium dichloride dimethylsilanediyl(2-methyl-N-phenyl-5-azapentalene)(2-methyl-4-(4'-n-pentylphenylindenyl)zirconium dichloride
dimethylsilanediyl(2-methyl-N-phenyl-6-azapentalene)(2-methyl-4-(4'-n-pentylphenylindenyl)zirconium dichloride
dimethylsilanediyl(2,5-dimethyl-4-azapentalene)(2-methyl-4-(4'-n-pentylphenylindenyl)zirconium dichloride
dimethylsilanediyl(2,5-dimethyl-6-azapentalene)(2-methyl-4-(4'-n-pentylphenylindenyl)zirconium dichloride
dimethylsilanediyl(2,5-dimethyl-N-phenyl-4-azapentalene)-(2-methyl-4-(4'-n-pentylphenylindenyl)zirconium dichloride
dimethylsilanediyl(2,5-dimethyl-N-phenyl-6-azapentalene)-(2-methyl-4-(4'-n-pentylphenylindenyl)zirconium dichloride
dimethylsilanediyl(2-methyl-4-thiapentalene)(2-methyl-4-(4'-n-pentylphenylindenyl)zirconium dichloride
dimethylsilanediyl(2-methyl-5-thiapentalene)(2-methyl-4-(4'-n-pentylphenylindenyl)zirconium dichloride
dimethylsilanediyl(2-methyl-6-thiapentalene)(2-methyl-4-(4'-n-pentylphenylindenyl)zirconium dichloride
dimethylsilanediyl(2,5-dimethyl-4-thiapentalene)(2-methyl-4-(4'-n-pentylphenylindenyl)zirconium dichloride
dimethylsilanediyl(2,5-dimethyl-6-thiapentalene)(2-methyl-4-(4'-n-pentylphenylindenyl)zirconium dichloride
dimethylsilanediyl(2-methyl-4-oxapentalene)(2-methyl-4-(4'-n-pentylphenylindenyl)zirconium dichloride
dimethylsilanediyl(2-methyl-5-oxapentalene)(2-methyl-4-(4'-n-pentylphenylindenyl)zirconium dichloride
dimethylsilanediyl(2-methyl-6-oxapentalene)(2-methyl-4-(4'-n-pentylphenylindenyl)zirconium dichloride
dimethylsilanediyl(2,5-dimethyl-4-oxapentalene)(2-methyl-4-(4'-n-pentylphenylindenyl)zirconium dichloride
dimethylsilanediyl(2,5-dimethyl-6-oxapentalene)(2-methyl-4-(4'-n-pentylphenylindenyl)zirconium dichloride
dimethylsilanediyl(2-methyl-4-azapentalene)(2-methyl-4-(4'-n-hexylphenylindenyl)zirconium dichloride
dimethylsilanediyl(2-methyl-5-azapentalene)(2-methyl-4-(4'-n-hexylphenylindenyl)zirconium dichloride
dimethylsilanediyl(2-methyl-6-azapentalene)(2-methyl-4-(4'-n-hexylphenylindenyl)zirconium dichloride
dimethylsilanediyl(2-methyl-N-phenyl-4-azapentalene)(2-methyl-4-(4'-n-hexylphenylindenyl)zirconium dichloride
dimethylsilanediyl(2-methyl-N-phenyl-5-azapentalene)(2-methyl-4-(4'-n-hexylphenylindenyl)zirconium dichloride
dimethylsilanediyl(2-methyl-N-phenyl-6-azapentalene)(2-methyl-4-(4'-n-hexylphenylindenyl)zirconium dichloride
dimethylsilanediyl(2,5-dimethyl-4-azapentalene)(2-methyl-4-(4'-n-hexylphenylindenyl)zirconium dichloride
dimethylsilanediyl(2,5-dimethyl-6-azapentalene)(2-methyl-4-(4'-n-hexylphenylindenyl)zirconium dichloride
dimethylsilanediyl(2,5-dimethyl-N-phenyl-4-azapentalene)-(2-methyl-4-(4'-n-hexylphenylindenyl)zirconium dichloride
dimethylsilanediyl(2,5-dimethyl-N-phenyl-6-azapentalene)-(2-methyl-4-(4'-n-hexylphenylindenyl)zirconium dichloride
dimethylsilanediyl(2-methyl-4-thiapentalene)(2-methyl-4-(4'-n-hexylphenylindenyl)zirconium dichloride
dimethylsilanediyl(2-methyl-5-thiapentalene)(2-methyl-4-(4'-n-hexylphenylindenyl)zirconium dichloride
dimethylsilanediyl(2-methyl-6-thiapentalene)(2-methyl-4-(4'-n-hexylphenylindenyl)zirconium dichloride
dimethylsilanediyl(2,5-dimethyl-4-thiapentalene)(2-methyl-4-(4'-n-hexylphenylindenyl)zirconium dichloride
dimethylsilanediyl(2,5-dimethyl-6-thiapentalene)(2-methyl-4-(4'-n-hexylphenylindenyl)zirconium dichloride
dimethylsilanediyl(2-methyl-4-oxapentalene)(2-methyl-4-(4'-n-hexylphenylindenyl)zirconium dichloride
dimethylsilanediyl(2-methyl-5-oxapentalene)(2-methyl-4-(4'-n-hexylphenylindenyl)zirconium dichloride
dimethylsilanediyl(2-methyl-6-oxapentalene)(2-methyl-4-(4'-n-hexylphenylindenyl)zirconium dichloride
dimethylsilanediyl(2,5-dimethyl-4-oxapentalene)(2-methyl-4-(4'-n-hexylphenylindenyl)zirconium dichloride
dimethylsilanediyl(2,5-dimethyl-6-oxapentalene)(2-methyl-4-(4'-n-hexylphenylindenyl)zirconium dichloride
dimethylsilanediyl(2-methyl-4-azapentalene)(2-methyl-4-(4'-cyclohexylphenylindenyl)zirconium dichloride
dimethylsilanediyl(2-methyl-5-azapentalene)(2-methyl-4-(4'-cyclohexylphenylindenyl)zirconium dichloride
dimethylsilanediyl(2-methyl-6-azapentalene)(2-methyl-4-(4'-cyclohexylphenylindenyl)zirconium dichloride
dimethylsilanediyl(2-methyl-N-phenyl-4-azapentalene)(2-methyl-4-(4'-cyclohexylphenylindenyl)zirconium dichloride
dimethylsilanediyl(2-methyl-N-phenyl-5-azapentalene)(2-methyl-4-(4'-cyclohexylphenylindenyl)zirconium dichloride
dimethylsilanediyl(2-methyl-N-phenyl-6-azapentalene)(2-methyl-4-(4'-cyclohexylphenylindenyl)zirconium dichloride
dimethylsilanediyl(2,5-dimethyl-4-azapentalene)(2-methyl-4-(4'-cyclohexylphenylindenyl)zirconium dichloride
dimethylsilanediyl(2,5-dimethyl-6-azapentalene)(2-methyl-4-(4'-cyclohexylphenylindenyl)zirconium dichloride
dimethylsilanediyl(2,5-dimethyl-N-phenyl-4-azapentalene)-(2-methyl-4-(4'-cyclohexylphenylindenyl)zirconium dichloride
dimethylsilanediyl(2,5-dimethyl-N-phenyl-6-azapentalene)-(2-methyl-4-(4'-cyclohexylphenylindenyl)zirconium dichloride
dimethylsilanediyl(2-methyl-4-thiapentalene)(2-methyl-4-(4'-cyclohexylphenylindenyl)zirconium dichloride
dimethylsilanediyl(2-methyl-5-thiapentalene)(2-methyl-4-(4'-cyclohexylphenylindenyl)zirconium dichloride
dimethylsilanediyl(2-methyl-6-thiapentalene)(2-methyl-4-(4'-cyclohexylphenylindenyl)zirconium dichloride
dimethylsilanediyl(2,5-dimethyl-4-thiapentalene)(2-methyl-4-(4'-cyclohexylphenylindenyl)zirconium dichloride
dimethylsilanediyl(2,5-dimethyl-6-thiapentalene)(2-methyl-4-(4'-cyclohexylphenylindenyl)zirconium dichloride
dimethylsilanediyl(2-methyl-4-oxapentalene)(2-methyl-4-(4'-cyclohexylphenylindenyl)zirconium dichloride
dimethylsilanediyl(2-methyl-5-oxapentalene)(2-methyl-4-(4'-cyclohexylphenylindenyl)zirconium dichloride
dimethylsilanediyl(2-methyl-6-oxapentalene)(2-methyl-4-(4'-cyclohexylphenylindenyl)zirconium dichloride
dimethylsilanediyl(2,5-dimethyl-4-oxapentalene)(2-methyl-4-(4'-cyclohexylphenylindenyl)zirconium dichloride
dimethylsilanediyl(2,5-dimethyl-6-oxapentalene)(2-methyl-4-(4'-cyclohexylphenylindenyl)zirconium dichloride
dimethylsilanediyl(2-methyl-4-azapentalene)(2-methyl-4-(4'-trimethylsilylphenylindenyl)zirconium dichloride
dimethylsilanediyl(2-methyl-5-azapentalene)(2-methyl-4-(4'-trimethylsilylphenylindenyl)zirconium dichloride
dimethylsilanediyl(2-methyl-6-azapentalene)(2-methyl-4-(4'-trimethylsilylphenylindenyl)zirconium dichloride
dimethylsilanediyl(2-methyl-N-phenyl-4-azapentalene)(2-methyl-4-(4'-trimethylsilylphenylindenyl)zirconium dichloride
dimethylsilanediyl(2-methyl-N-phenyl-5-azapentalene)(2-methyl-4-(4'-trimethylsilylphenylindenyl)zirconium dichloride dimethylsilanediyl(2-methyl-N-phenyl-6-azapentalene)(2-methyl-4-(4'-trimethylsilylphenylindenyl)zirconium dichloride
dimethylsilanediyl(2,5-dimethyl-4-azapentalene)(2-methyl-4-(4'-trimethylsilylphenylindenyl)zirconium dichloride
dimethylsilanediyl(2,5-dimethyl-6-azapentalene)(2-methyl-4-(4'-trimethylsilylphenylindenyl)zirconium dichloride
dimethylsilanediyl(2,5-dimethyl-N-phenyl-4-azapentalene)-(2-methyl-4-(4'-trimethylsilylphenylindenyl)zirconium dichloride
dimethylsilanediyl(2,5-dimethyl-N-phenyl-6-azapentalene)-(2-methyl-4-(4'-trimethylsilylphenylindenyl)zirconium dichloride
dimethylsilanediyl(2-methyl-4-thiapentalene)(2-methyl-4-(4'-trimethylsilylphenylindenyl)zirconium dichloride
dimethylsilanediyl(2-methyl-5-thiapentalene)(2-methyl-4-(4'-trimethylsilylphenylindenyl)zirconium dichloride
dimethylsilanediyl(2-methyl-6-thiapentalene)(2-methyl-4-(4'-trimethylsilylphenylindenyl)zirconium dichloride
dimethylsilanediyl(2,5-dimethyl-4-thiapentalene)(2-methyl-4-(4'-trimethylsilylphenylindenyl)zirconium dichloride
dimethylsilanediyl(2,5-dimethyl-6-thiapentalene)(2-methyl-4-(4'-trimethylsilylphenylindenyl)zirconium dichloride
dimethylsilanediyl(2-methyl-4-oxapentalene)(2-methyl-4-(4'-trimethylsilylphenylindenyl)zirconium dichloride
dimethylsilanediyl(2-methyl-5-oxapentalene)(2-methyl-4-(4'-trimethylsilylphenylindenyl)zirconium dichloride
dimethylsilanediyl(2-methyl-6-oxapentalene)(2-methyl-4-(4'-trimethylsilylphenylindenyl)zirconium dichloride
dimethylsilanediyl(2,5-dimethyl-4-oxapentalene)(2-methyl-4-(4'-trimethylsilylphenylindenyl)zirconium dichloride
dimethylsilanediyl(2,5-dimethyl-6-oxapentalene)(2-methyl-4-(4'-trimethylsilylphenylindenyl)zirconium dichloride
dimethylsilanediyl(2-methyl-4-azapentalene)(2-methyl-4-(4'-adamantylphenylindenyl)zirconium dichloride
dimethylsilanediyl(2-methyl-5-azapentalene)(2-methyl-4-(4'-adamantylphenylindenyl)zirconium dichloride
dimethylsilanediyl(2-methyl-6-azapentalene)(2-methyl-4-(4'-adamantylphenylindenyl)zirconium dichloride
dimethylsilanediyl(2-methyl-N-phenyl-4-azapentalene)(2-methyl-4-(4'-adamantylphenylindenyl)zirconium dichloride
dimethylsilanediyl(2-methyl-N-phenyl-5-azapentalene)(2-methyl-4-(4'-adamantylphenylindenyl)zirconium dichloride
dimethylsilanediyl(2-methyl-N-phenyl-6-azapentalene)(2-methyl-4-(4'-adamantylphenylindenyl)zirconium dichloride
dimethylsilanediyl(2,5-dimethyl-4-azapentalene)(2-methyl-4-(4'-adamantylphenylindenyl)zirconium dichloride
dimethylsilanediyl(2,5-dimethyl-6-azapentalene)(2-methyl-4-(4'-adamantylphenylindenyl)zirconium dichloride
dimethylsilanediyl(2,5-dimethyl-4-azapentalene)(2-methyl-4-(4'-adamantylphenylindenyl)zirconium dichloride
dimethylsilanediyl(2,5-dimethyl-N-phenyl-4-azapentalene)-(2-methyl-4-(4'-adamantylphenylindenyl)zirconium dichloride
dimethylsilanediyl(2,5-dimethyl-N-phenyl-6-azapentalene)-(2-methyl-4-(4'-adamantylphenylindenyl)zirconium dichloride
dimethylsilanediyl(2-methyl-4-thiapentalene)(2-methyl-4-(4'-adamantylphenylindenyl)zirconium dichloride
dimethylsilanediyl(2-methyl-5-thiapentalene)(2-methyl-4-(4'-adamantylphenylindenyl)zirconium dichloride
dimethylsilanediyl(2-methyl-6-thiapentalene)(2-methyl-4-(4'-adamantylphenylindenyl)zirconium dichloride
dimethylsilanediyl(2,5-dimethyl-4-thiapentalene)(2-methyl-4-(4'-adamantylphenylindenyl)zirconium dichloride
dimethylsilanediyl(2,5-dimethyl-6-thiapentalene)(2-methyl-4-(4-adamantylphenylindenyl)zirconium dichloride
dimethylsilanediyl(2-methyl-4-oxapentalene)(2-methyl-4-(4'-adamantylphenylindenyl)zirconium dichloride
dimethylsilanediyl(2-methyl-5-oxapentalene)(2-methyl-4-(4'-adamantylphenylindenyl)zirconium dichloride
dimethylsilanediyl(2-methyl-6-oxapentalene)(2-methyl-4-(4'-adamantylphenylindenyl)zirconium dichloride
dimethylsilanediyl(2,5-dimethyl-4-oxapentalene)(2-methyl-4-(4'-adamantylphenylindenyl)zirconium dichloride
dimethylsilanediyl(2,5-dimethyl-6-oxapentalene)(2-methyl-4-(4'-adamantylphenylindenyl)zirconium dichloride
dimethylsilanediyl(2-methyl-4-azapentalene)(2-methyl-4-(4'-tris(trifluoromethyl)methylphenylindenyl)zirconium dichloride
dimethylsilanediyl(2-methyl-5-azapentalene)(2-methyl-4-(4'-tris(trifluoromethyl)methylphenylindenyl)zirconium dichloride
dimethylsilanediyl(2-methyl-6-azapentalene)(2-methyl-4-(4'-tris(trifluoromethyl)methylphenylindenyl)zirconium dichloride
dimethylsilanediyl(2-methyl-N-phenyl-4-azapentalene)(2-methyl-4-(4'-tris(trifluoromethyl)methylphenylindenyl)zirconium dichloride
dimethylsilanediyl(2-methyl-N-phenyl-5-azapentalene)(2-methyl-4-(4'-tris(trifluoromethyl)methylphenylindenyl)zirconium dichloride
dimethylsilanediyl(2-methyl-N-phenyl-6-azapentalene)(2-methyl-4-(4'-tris(trifluoromethyl)methylphenylindenyl)zirconium dichloride
dimethylsilanediyl(2,5-dimethyl-4-azapentalene)(2-methyl-4-(4'-tris(trifluoromethyl)methylphenylindenyl)zirconium dichloride
dimethylsilanediyl(2,5-dimethyl-6-azapentalene)(2-methyl-4-(4'-tris(trifluoromethyl)methylphenylindenyl)zirconium dichloride
dimethylsilanediyl(2,5-dimethyl-N-phenyl-4-azapentalene)-(2-methyl-4-(4'-tris(trifluoromethyl)methylphenylindenyl)-zirconium dichloride
dimethylsilanediyl(2,5-dimethyl-N-phenyl-6-azapentalene)-(2-methyl-4-(4'-tris(trifluoromethyl)methylphenylindenyl)-zirconium dichloride
dimethylsilanediyl(2-methyl-4-thiapentalene)(2-methyl-4-(4'-tris(trifluoromethyl)methylphenylindenyl)zirconium dichloride
dimethylsilanediyl(2-methyl-5-thiapentalene)(2-methyl-4-(4'-tris(trifluoromethyl)methylphenylindenyl)zirconium dichloride
dimethylsilanediyl(2-methyl-6-thiapentalene)(2-methyl-4-(4'-tris-(trifluoromethyl)methylphenylindenyl)zirconium dichloride
dimethylsilanediyl(2,5-dimethyl-4-thiapentalene)(2-methyl-4-(4'-tris(trifluoromethyl)methylphenylindenyl)zirconium dichloride
dimethylsilanediyl(2,5-dimethyl-6-thiapentalene)(2-methyl-4-(4'-tris(trifluoromethyl)methylphenylindenyl)zirconium dichloride
dimethylsilanediyl(2-methyl-4-oxapentalene)(2-methyl-4-(4'-tris(trifluoromethyl)methylphenylindenyl)zirconium dichloride
dimethylsilanediyl(2-methyl-5-oxapentalene)(2-methyl-4-(4'-tris(trifluoromethyl)methylphenylindenyl)zirconium dichloride dimethylsilanediyl(2-methyl-6-oxapentalene)(2-methyl-4-(4'-tris(trifluoromethyl)methylphenylindenyl)zirconium dichloride dimethylsilanediyl(2,5-dimethyl-4-oxapentalene)(2-methyl-4-(4'-tris(trifluoromethyl)methylphenylindenyl)zirconium dichloride dimethylsilanediyl(2,5-dimethyl-6-oxapentalene)(2-methyl-4-(4'-tris(trifluoromethyl)methylphenylindenyl)zirconium dichloride dimethylsilanediyl(2-methyl-4-azapentalene)(2-ethyl-4-(4'-tert-butylphenylindenyl)zirconium dichloride dimethylsilanediyl(2-methyl-5,6-dihydro-4-azapentalene)(2-ethyl-4-(4'-tert-butylphenylindenyl)zirconium dichloride dimethylsilanediyl(2-methyl-4-azapentalene)(2-ethyl-4-(4'-tert-butylphenyltetrahydroindenyl)zirconium dichloride dimethylsilanediyl(2-methyl-5-azapentalene)(2-n-butyl-4-(4'-tert-butylphenylindenyl)zirconium dichloride ethylidene(2-methyl-6-azapentalene)(2-methyl-4-(4'-tert-butylphe-nylindenyl)zirconium dichloride dimethylsilanediyl(2-methyl-N-trimethylsilyl-4-azapentalene)-(2-methyl-4-(4'-tert-butylphenylindenyl)zirconium dichloride dimethylsilanediyl(2-methyl-N-tolyl-5-azapentalene)(2-n-propyl-4-(4'-tert-butylphenylindenyl)zirconium dichloride dimethylgermanediyl(2-methyl-N-phenyl-6-azapentalene)(2-methyl-4-(4'-tert-butylphenylindenyl)zirconium dichloride methylethylidene(2,5-dimethyl-4-azapentalene)(2-methyl-4-(4'-tert-butylphenylindenyl)zirconium dichloride dimethylsilanediyl(2,5-diisopropyl-6-azapentalene)(2-methyl-4-(41'-tert-butylphenylindenyl)zirconium dichloride dimethylsilanediyl(2,5-dimethyl-N-phenyl-4-azapentalene)-(2,6-dimethyl-4-(4'-tert-butylphenylindenyl)zirconium dichloride dimethylsilanediyl(2,5-dimethyl-N-phenyl-6-azapentalene)-(2-methyl-4-(6'-tert-butylnaphthylindenyl)zirconium dichloride dimethylsilanediyl(2,5-dimethyl-N-phenyl-6-azapentalene)-(2-methyl-4-(6'-tert-butylanthracenylindenyl)zirconium dichloride dimethylsilanediyl(2-methyl-4-phosphapentalene)(2-methyl-4-(4'-tert-butylphenylindenyl)zirconium dichloride diphenylsilanediyl(2-methyl-5-thiapentalene)(2-methyl-4-(4'-tert-butylphenylindenyl)zirconium dichloride methylphenylsilanediyl(2-methyl-6-thiapentalene)(2-methyl-4-(4'-tert-butylphenylindenyl)zirconium dichloride methylidene(2,5-dimethyl-4-thiapentalene)(2-methyl-4-(4'-tert-butylphenylindenyl)zirconium dichloride dimethylmethylidene(2,5-dimethyl-6-thiapentalene)(2-methyl-4-(4'-tert-butylphenylindenyl)zirconium dichloride diphenylsilanediyl(2,5-dimethyl-4-oxapentalene)(2-methyl-4-(4'-tert-butylphenylindenyl)zirconium dichloride diphenylsilanediyl(2,5-dimethyl-6-oxapentalene)(2-methyl-4-(4'-tert-butylphenylindenyl)zirconium dichloride, or one of the corresponding homologues of the abovementioned compounds substituted in the 2 position or in the 2,5 positions by ethyl, n-propyl, isopropyl, isobutyl, n-butyl or s-butyl.

8. A catalyst system comprising at least one metallocene of the formula I as claimed in claim 1, at least one cocatalyst and at least one support.

9. A catalyst system as claimed in claim 8 which further comprises at least one further additive component.

10. A process for preparing polyolefins by polymerization of one or more olefins in the presence of a catalyst system as claimed in claim 8.

* * * * *

UNITED STATES PATENT AND TRADEMARK OFFICE
CERTIFICATE OF CORRECTION

PATENT NO.    : 6,469,114 B1
DATED         : October 22, 2002
INVENTOR(S)   : Schottek et al.

It is certified that error appears in the above-identified patent and that said Letters Patent is hereby corrected as shown below:

Column 36,
Line 37, "(2-methyl-4-(41-isopropylphenylindenyl)" should be -- (2-methyl-4-(4'-isopropylphenylindenyl) --.

Column 37,
Line 57, "(2,$^5$-dimethyl" should be -- (2,5-dimethyl --.

Column 42,
Line 5, "methyl-4-(4-adamantylpenylindenyl)" should be -- methyl-4-(4'-adamantylphenylindenyl) --.
Lines 43 and 46, "methylphenylindenyl)-zirconium" should be
-- methylphenylindenyl)zirconium --.

Column 43,
Line 20, "butylphe-nylindenyl" should be -- butylphenylindenyl --.
Line 33, "methyl-4-(41'-tert-butylphenylindenyl)" should be
-- methyl-4-(4'-tert-butylphenylindenyl) --.

Signed and Sealed this

Eleventh Day of February, 2003

JAMES E. ROGAN
*Director of the United States Patent and Trademark Office*